United States Patent
Soulages et al.

(10) Patent No.: US 11,952,480 B2
(45) Date of Patent: Apr. 9, 2024

(54) ENHANCED PROCESSABILITY OF LLDPE BY ADDITION OF ULTRA-HIGH MOLECULAR WEIGHT DENSITY POLYETHYLENE

(71) Applicant: ExxonMobil Chemical Patents Inc., Baytown, TX (US)

(72) Inventors: Johannes M. Soulages, Basking Ridge, NJ (US); Arnold Lustiger, Edison, NJ (US); Thomas T. Sun, Clinton, NJ (US); Pamela J. Wright, Easton, PA (US); Madhavi Vadlamudi, Clinton, NJ (US); Alexander I. Norman, Somerville, NJ (US); Adriana S. Silva, Houston, TX (US); David M. Fiscus, Houston, TX (US); Timothy D. Shaffer, Plainfield, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 182 days.

(21) Appl. No.: 16/763,909

(22) PCT Filed: Feb. 5, 2019

(86) PCT No.: PCT/IB2019/000220
§ 371 (c)(1),
(2) Date: May 13, 2020

(87) PCT Pub. No.: WO2019/162760
PCT Pub. Date: Aug. 29, 2019

(65) Prior Publication Data
US 2021/0371632 A1 Dec. 2, 2021

Related U.S. Application Data

(60) Provisional application No. 62/626,240, filed on Feb. 5, 2018.

(51) Int. Cl.
*C08L 23/08* (2006.01)
*B29C 48/00* (2019.01)
(Continued)

(52) U.S. Cl.
CPC ........ *C08L 23/0815* (2013.01); *B29C 48/022* (2019.02); *B29C 48/10* (2019.02);
(Continued)

(58) Field of Classification Search
CPC ................. C08L 23/04; C08L 23/0815; C08L 2205/025; C08L 2207/066;
(Continued)

(56) References Cited

U.S. PATENT DOCUMENTS

| 4,158,088 A | 6/1979 | Ito et al. |
| 4,230,831 A | 10/1980 | Sakurai et al. |

(Continued)

FOREIGN PATENT DOCUMENTS

| CN | 101003651 A | 7/2007 |
| CN | 103254342 A | 8/2013 |

(Continued)

OTHER PUBLICATIONS

Cowell, Timothy J., et al. (2002) "HDPE Barrier Film Resins-MW and MWD Effects-and Their Blends with mLLDPE" Journal of Plastic Film & Sheeting, vol. 18, pp. 91-103.
(Continued)

*Primary Examiner* — Maria V Ewald
*Assistant Examiner* — Daniel P Dillon
(74) *Attorney, Agent, or Firm* — ExxonMobil Technology and Engineering Company-Chem

(57) ABSTRACT

In some embodiments, the present disclosure provides a composition comprising 1) about 97.5 wt % to about 99.9 wt % of a first polyethylene having a density of about 0.91 $g/cm^3$ to about 0.94 $g/cm^3$, and a melt strength of about 10
(Continued)

mN or greater; and 2) about 0.1 wt % to about 2.5 wt % of a second polyethylene having an Mw of about 500,000 g/mol or more. In some embodiments, the composition is a film. In some embodiments, the present disclosure provides a method of making a composition comprising blending a first polyethylene of any embodiment described herein and a second polyethylene of any embodiment described herein.

17 Claims, 1 Drawing Sheet

(51) Int. Cl.
- *B29C 48/10* (2019.01)
- *C08J 5/18* (2006.01)
- *B29K 23/00* (2006.01)
- *B29K 105/00* (2006.01)

(52) U.S. Cl.
CPC ......... *C08J 5/18* (2013.01); *B29K 2023/0625* (2013.01); *B29K 2023/0683* (2013.01); *B29K 2105/0088* (2013.01); *B29K 2995/0063* (2013.01); *B29K 2995/0077* (2013.01); *C08J 2323/08* (2013.01); *C08J 2423/08* (2013.01); *C08L 2205/025* (2013.01); *C08L 2207/066* (2013.01); *C08L 2207/068* (2013.01)

(58) Field of Classification Search
CPC ...... C08L 2207/068; B29K 2023/0625; B29K 2023/0683; B29K 2105/0088
See application file for complete search history.

(56) References Cited

U.S. PATENT DOCUMENTS

| | | | |
|---|---|---|---|
| 4,390,666 A | 6/1983 | Moriguchi et al. | |
| 4,511,704 A | 4/1985 | Tanaka et al. | |
| 4,792,588 A | 12/1988 | Suga et al. | |
| 4,824,912 A | 4/1989 | Su | |
| 4,879,076 A | 11/1989 | Sano et al. | |
| 4,996,011 A | 2/1991 | Sano et al. | |
| 5,102,955 A | 4/1992 | Calabro et al. | |
| 5,210,167 A | 5/1993 | Firdaus et al. | |
| 5,284,613 A | 2/1994 | Ali et al. | |
| 5,319,029 A | 6/1994 | Martin et al. | |
| 5,326,835 A | 7/1994 | Ahvenainen et al. | |
| 5,369,194 A | 11/1994 | Cribbs et al. | |
| 5,380,803 A | 1/1995 | Coutant et al. | |
| 5,494,965 A | 2/1996 | Harlin et al. | |
| 5,503,914 A | 4/1996 | Michie, Jr. et al. | |
| 5,514,634 A | 5/1996 | Hagerty et al. | |
| 5,527,867 A | 6/1996 | Bergmeister | |
| 5,539,076 A | 7/1996 | Nowlin et al. | |
| 5,589,539 A | 12/1996 | Wagner et al. | |
| 5,624,877 A | 4/1997 | Bergmeister et al. | |
| 5,648,439 A | 7/1997 | Bergmeister et al. | |
| 5,840,244 A | 11/1998 | Firdaus et al. | |
| 5,882,750 A | 3/1999 | Mink et al. | |
| 6,051,525 A | 4/2000 | Lo et al. | |
| 6,090,893 A | 7/2000 | Harlin et al. | |
| 6,265,504 B1 * | 7/2001 | Liu | C08F 110/02 502/200 |
| 6,316,546 B1 | 11/2001 | Ong et al. | |
| 6,355,733 B1 | 3/2002 | Williams et al. | |
| 6,355,741 B1 | 3/2002 | Marechal | |
| 6,403,181 B1 | 6/2002 | Barry et al. | |
| 6,417,130 B1 | 7/2002 | Mink et al. | |
| 6,545,093 B1 | 4/2003 | De Lange et al. | |
| 6,552,150 B1 | 4/2003 | Nummila-pakarinen et al. | |
| 6,573,343 B1 | 6/2003 | Follestad | |
| 6,632,884 B1 | 10/2003 | Skar et al. | |
| 6,642,323 B1 | 11/2003 | Myhre et al. | |
| 6,713,425 B2 | 3/2004 | Mink et al. | |
| 6,734,265 B1 * | 5/2004 | Dekmezian | C08F 210/16 525/240 |
| 6,740,617 B2 | 5/2004 | Mink et al. | |
| 6,780,809 B1 | 8/2004 | Follestad et al. | |
| 6,828,395 B1 | 12/2004 | Ehrman et al. | |
| 6,878,454 B1 | 4/2005 | Shannon et al. | |
| 6,932,592 B2 | 8/2005 | Farley et al. | |
| 7,018,710 B2 | 3/2006 | Kallio et al. | |
| 7,172,987 B2 | 2/2007 | Kao et al. | |
| 7,321,015 B2 | 1/2008 | Hoang et al. | |
| 7,323,523 B2 | 1/2008 | Hoang et al. | |
| 7,504,141 B2 | 3/2009 | Myhre et al. | |
| 7,576,166 B2 | 8/2009 | Aeaerilae et al. | |
| 7,632,907 B2 | 12/2009 | Sukhadia et al. | |
| 7,714,072 B2 | 5/2010 | Michie, Jr. et al. | |
| 7,812,094 B2 | 10/2010 | Kvamme et al. | |
| 7,951,873 B2 * | 5/2011 | Best | B32B 27/32 526/348 |
| 7,951,883 B1 | 5/2011 | Mehta et al. | |
| 8,222,176 B2 | 7/2012 | Kao et al. | |
| 8,455,601 B2 | 6/2013 | Kolb et al. | |
| 8,476,394 B2 | 7/2013 | St. Jean et al. | |
| 8,569,194 B2 | 10/2013 | Xu et al. | |
| 8,580,895 B2 | 11/2013 | Standaert et al. | |
| 8,609,792 B2 | 12/2013 | Vantomme et al. | |
| 9,783,661 B2 | 10/2017 | Dou et al. | |
| 10,679,768 B2 | 6/2020 | Hagstrand et al. | |
| 10,886,034 B2 | 1/2021 | Hagstrand et al. | |
| 2002/0042472 A1 | 4/2002 | Ong et al. | |
| 2004/0030066 A1 | 2/2004 | Loveday et al. | |
| 2004/0039115 A1 | 2/2004 | Ishida | |
| 2004/0044154 A1 | 3/2004 | Kuo et al. | |
| 2005/0003175 A1 | 1/2005 | Nygard et al. | |
| 2005/0085600 A1 | 4/2005 | Ehrman et al. | |
| 2005/0153148 A1 | 7/2005 | Shannon et al. | |
| 2005/0288443 A1 | 12/2005 | Mavridis et al. | |
| 2006/0074194 A1 | 4/2006 | Berthold et al. | |
| 2006/0281867 A1 | 12/2006 | Jaker | |
| 2007/0167585 A1 | 7/2007 | Garrison et al. | |
| 2007/0260016 A1 | 11/2007 | Best et al. | |
| 2008/0045647 A1 | 2/2008 | Kwalk | |
| 2008/0064817 A1 | 3/2008 | Kwalk | |
| 2008/0125547 A1 | 5/2008 | Swogger et al. | |
| 2008/0139750 A1 | 6/2008 | Berthold et al. | |
| 2008/0166535 A1 | 7/2008 | Berthold et al. | |
| 2008/0199674 A1 | 8/2008 | Berthold et al. | |
| 2009/0036610 A1 | 2/2009 | Jaker | |
| 2009/0061135 A1 | 3/2009 | Wang et al. | |
| 2009/0192270 A1 * | 7/2009 | Malakoff | C08J 5/18 525/240 |
| 2010/0055432 A1 | 3/2010 | Etherton et al. | |
| 2010/0084363 A1 | 4/2010 | Michie, Jr. et al. | |
| 2010/0130705 A1 | 5/2010 | Lindroos et al. | |
| 2010/0133714 A1 | 6/2010 | Jaker et al. | |
| 2011/0003099 A1 | 1/2011 | Vinck | |
| 2011/0034635 A1 | 2/2011 | Kapur et al. | |
| 2011/0160403 A1 * | 6/2011 | Mavridis | C08L 23/0815 525/240 |
| 2011/0217537 A1 | 9/2011 | Fantinel et al. | |
| 2011/0263801 A1 | 10/2011 | Garoff et al. | |
| 2012/0091621 A1 | 4/2012 | Coffy et al. | |
| 2012/0108752 A1 | 5/2012 | Berthold et al. | |
| 2012/0220747 A1 | 8/2012 | Jaker et al. | |
| 2012/0271015 A1 | 10/2012 | Kao et al. | |
| 2012/0282422 A1 | 11/2012 | Boissiere et al. | |
| 2013/0046061 A1 | 2/2013 | Hermel-davidock et al. | |
| 2013/0099424 A1 | 4/2013 | Rohatgi et al. | |
| 2015/0225555 A1 * | 8/2015 | Mather | C08L 23/06 525/240 |
| 2016/0272798 A1 | 9/2016 | Cheng et al. | |
| 2016/0289434 A1 * | 10/2016 | Tapsak | C08L 23/06 |
| 2016/0347939 A1 * | 12/2016 | Dou | C08J 3/005 |
| 2017/0210890 A1 * | 7/2017 | Karjala | C08L 23/0815 |
| 2019/0237213 A1 | 8/2019 | Hagstrand et al. | |

(56) References Cited

U.S. PATENT DOCUMENTS

| | | |
|---|---|---|
| 2019/0326033 A1 | 10/2019 | Hagstrand et al. |
| 2021/0371632 A1 | 12/2021 | Soulages et al. |

FOREIGN PATENT DOCUMENTS

| | | |
|---|---|---|
| DE | 102005009916 A1 | 9/2006 |
| EP | 0588147 A1 | 3/1994 |
| EP | 0713889 A2 | 5/1996 |
| EP | 0778289 A1 | 6/1997 |
| EP | 0952164 A1 | 10/1999 |
| EP | 1364971 A2 | 11/2003 |
| EP | 1655339 A1 | 5/2006 |
| EP | 2077284 A1 | 7/2009 |
| EP | 2428526 A1 | 3/2012 |
| EP | 2463315 A2 | 6/2012 |
| IN | 2004 | 12/2009 |
| JP | S57128707 A | 8/1982 |
| JP | S609788 A | 1/1985 |
| JP | S6026049 A | 2/1985 |
| JP | S60026050 A | 2/1985 |
| JP | S60055042 A | 3/1985 |
| JP | S63213539 A | 9/1988 |
| JP | H05200479 A | 8/1993 |
| JP | H05293886 A | 11/1993 |
| JP | H05311016 A | 11/1993 |
| JP | H08208898 A | 8/1996 |
| JP | H08269257 A | 10/1996 |
| JP | H09208759 A | 8/1997 |
| JP | H09235428 A | 9/1997 |
| JP | H10212376 A | 8/1998 |
| JP | H11166081 A | 6/1999 |
| JP | 2000038482 A | 2/2000 |
| JP | 2000178383 A | 6/2000 |
| JP | 2001288203 A | 10/2001 |
| JP | 2003128848 A | 5/2003 |
| JP | 2004051831 A | 2/2004 |
| JP | 2005097522 A | 4/2005 |
| JP | 2005272605 A | 10/2005 |
| JP | 2006131814 A | 5/2006 |
| JP | 2007146084 A | 6/2007 |
| JP | 2007284667 A | 11/2007 |
| JP | 2008088248 A | 4/2008 |
| JP | 2010167640 A | 8/2010 |
| KR | 20010020425 A | 3/2001 |
| TW | 200513470 A | 4/2005 |
| WO | 9215619 A1 | 9/1992 |
| WO | 9742237 A1 | 11/1997 |
| WO | 2007104513 A1 | 9/2000 |
| WO | 0071615 A1 | 11/2000 |
| WO | 0109200 A1 | 2/2001 |
| WO | 01092350 A1 | 12/2001 |
| WO | 2004060864 A2 | 7/2004 |
| WO | 2006045550 A1 | 5/2006 |
| WO | 2011101438 A1 | 8/2011 |
| WO | WO-2013006409 A1 * | 1/2013 | ............ C08L 23/06 |
| WO | WO 2017-077455 A2 | 5/2017 |

OTHER PUBLICATIONS

Cribbs, Leonard, et al (2001) "High molecular weight film resins with increased stiffness" Journal of Plastic Film & Sheeting, vol. 174, pp. 291-305.

Tas, Paul, et al. (2005) "Processability and film performance of single site site sLLDPE/LDPE blends" Boston: SPE ANTEC 2005, vol. 5, pp. 1-5.

Liu, Cai Jun, et al. (2012) "Effect of Electromagnetic Vibration on the Rheological Properties of HDPE/UHMWPE Blends and the Properties of the Blown Films" Advanced Materials Research, vols. 488-489, Trans Tech Publications, pp. 659-665.

Liu, Han-Tai, et al. (2003) "Bimodal polyethylene products from UNIPOLTM single gas phase reactor using engineered catalysts", Macromolecular symposia, vol. 195, pp. 309-316.

Suwa, Jun-ichi, et al. (2007) "Molecular weight segregation on surfaces of polyethylene blended films as estimated from nanoscratch tests using scanning probe microscopy", Langmuir, vol. 23, pp. 5882-5885.

Ueda, H., (1986) "Characterization of mixtures of linear polyethylenes of ultrahigh and moderate molecular weights", Polymer Engineering & Science vol. 26, No. 21, pp. 1483-1488.

Zhang, Fa-Sheng, et al. (1987) "The supermolecular structure and mechanical properties of the hard elastic films of medium and ultra-high molecular weight polyethylene blend", Dept of Organic and Polymeric Materials, Institute of Technology, Sen'i Gakkaishi, vol. 44, No. 3, pp. 120-128.

Zhao, Yong, et al. (1993) "Morphology and mechanical properties of melt-drawn films of blends of high-density polyethylene and ultrahigh-molecular-weight polyethylene", Journal of Materials Science Letters 12, pp. 1309-1312.

Zuo, Jian Dong, et al. (2010) "Properties of HDPE/UHMWPE blown films", Advanced Materials Research vols. 87-88, Trans Tech Publications, pp. 239-243.

Zuo, Jian-Dong, et al. (2007) "Preparation of HDPE/UHMWPE/MMWPE blends by two-step processing way and properties of blown films", Polymer bulletin 58, pp. 711-722.

Alexander Kurek, et al (2010) Mesoporous Silica Supported Multiple Single-Site Catalysts and Polyethylene Reactor Blends with Tailor-Made Trimodal and Ultra-Broad Molecular Weight Distributions, Macromol. Rapid Commun., 2010, 31, pp. 1359-1363.

H. Münstedt et al., (1980) "Dependence of the Elongational Behavior of Polystyrene Melts on Molecular Weight and Molecular Weight Distribution*", Journal of Rheology, 24(6), pp. 847-867.

M. M. Dumoulin et al., (1984) "Rheological and Mechanical Behavior of the UHMWPE/MDPE Mixtures", Polymer Engineering and Science, 24(2), pp. 117-126.

* cited by examiner

ENHANCED PROCESSABILITY OF LLDPE BY ADDITION OF ULTRA-HIGH MOLECULAR WEIGHT DENSITY POLYETHYLENE

CROSS REFERENCE TO RELATED APPLICATIONS

This application is a National Phase Application claiming priority to PCT Application Serial No. PCT/IB2019/000220, filed Feb. 5, 2019, which claims the benefit of Ser. No. 62/626,240, filed on Feb. 5, 2018, the disclosures of both which are incorporated by reference in their entirety.

FIELD OF INVENTION

The present disclosure relates to polyethylene compositions comprising an ethylene based polymer and an ultra-high molecular weight polyethylene.

BACKGROUND

Polyolefins are widely used commercially because of their robust physical properties. For example, various types of polyethylenes, including high density, low density, and linear low density polyethylenes, are some of the most commercially useful. Therefore, there is interest in finding new polymers having improved properties. For many polyolefin applications, including films and fibers, increased shear thinning and increased melt strength are desirable attributes. Higher shear thinning leads to lower motor torques in extrusion and higher melt strength allows fabricators to run their blown film lines at a faster rate. These attributes also allow them to handle thicker films in applications such as geomembranes.

Typical metallocene catalyzed polyethylenes (mPE) are more difficult to process than low-density polyethylenes (LDPE) made in a high-pressure polymerization process. Generally, mPEs (which tend to have narrow molecular weight distributions and low levels of branching) require more motor power and produce higher extruder pressures to match the extrusion rate of LDPEs. Typical mPEs also have lower melt strength which, for example, adversely affects bubble stability during blown film extrusion, and they are prone to melt fracture at commercial shear rates. On the other hand, mPEs exhibit superior physical properties as compared to LDPEs. In the past, various levels of LDPE have been blended with the mPE to increase melt strength, to increase shear sensitivity, i.e., to increase flow at commercial shear rates in extruders; and to reduce the tendency to melt fracture. However, these blends generally have poor mechanical properties as compared with neat mPE. It has been a challenge to improve mPEs processability without sacrificing physical properties.

Reference of interest include: U.S. Publication No. 2016/0272798; U.S. Publication No. 2007/0260016; Monstedt and coworkers, J. Rheol., 24(6), 847 (1980); Dumoulin et al., Polymer Sci. Eng., 24(2), 117 (1984); U.S. Pat. Nos. 8,455,601; 5,210,167; 5,840,244; Kurek et al., Proceedings of the American Chemical Society (2008) and Kurek and coworkers, Macromol. Rapid Commun., 31(15), 1359-1363 (2010).

Extensional hardening and shear thinning are critical for blown film bubble stability and good extrusion characteristics, respectively. They are required to achieve faster blown film line speed, which is currently only achievable by adding LDPE (low density polyethylene), a linear PE grade known to exhibit strain hardening. LDPE has been shown to reduce film performance, even at low concentrations. As an alternative, there is a need to build in an optimal amount of linear UHMW-PE (ultra-high molecular weight polyethylene) to improve melt processability without reducing film mechanical properties, such as Dart.

Therefore, there is a need for compositions that advantageously improve the processability of polyethylene without significantly impacting its mechanical properties of the blown film. Furthermore, there is a need for a different set of relationships between processability and properties of polyethylenes and their blends as compared to those available from traditional polyethylenes and their blends with conventional branched LDPE, which allow for new and advantageous properties of the fabricated articles.

SUMMARY

In an embodiment, the present disclosure provides a composition. The composition includes 1) about 97.5 wt % to about 99.9 wt % of a first polyethylene having a density of about 0.91 g/cm$^3$ to about 0.94 g/cm$^3$, and a melt strength of about 10 mN or greater; and 2) about 0.1 wt % to about 2.5 wt % of a second polyethylene having an Mw of about 500,000 g/mol or more.

In at least one embodiment, a film is provided. The film includes any composition described herein.

In at least one embodiment, a method of making a composition is provided. The method includes blending the first polyethylene of any embodiment described herein and the second polyethylene of any embodiment described herein.

BRIEF DESCRIPTION OF THE FIGURES

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

DETAILED DESCRIPTION

Figure 1:
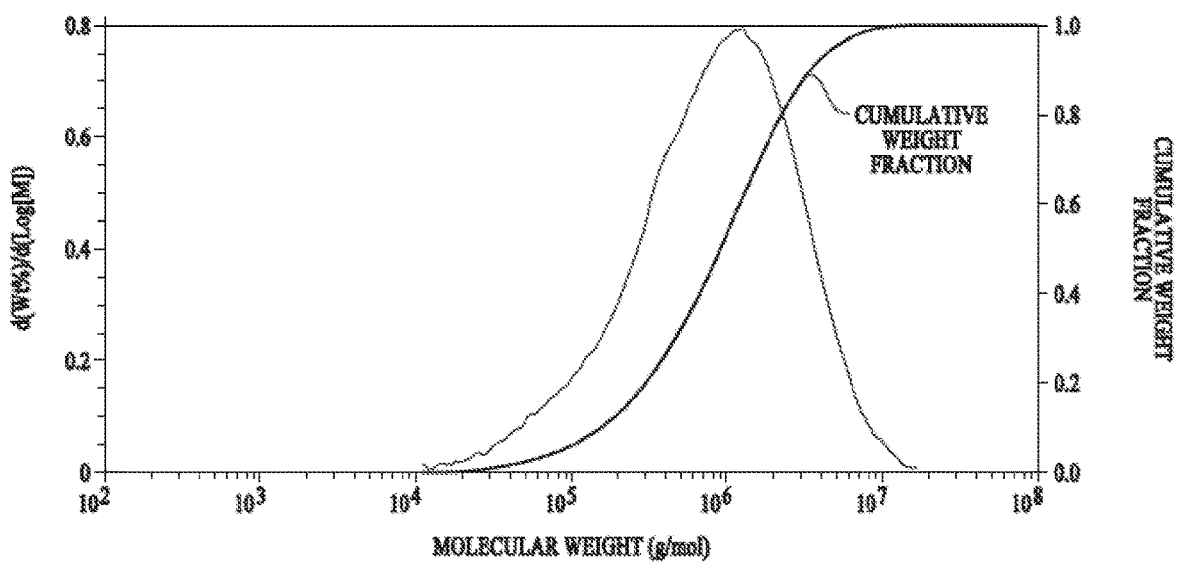
FIG. 1 is a graph illustrating dWt/d Log M versus molecular weight and cumulative weight fraction versus molecular weight obtained from gel permeation chromatography for a representative linear UHMW polyethylene.

The present disclosure relates to polyethylene compositions comprising one or more polyethylenes and an ultra-high molecular weight (UHMW) polyethylene (also referred to as a UHMW tail). More particularly, the present disclosure relates to polyethylene compositions having improved properties such as melt strength or extensional strain hardening, without substantial loss in dart impact, MD tear, or other blown film mechanical properties.

The disclosure shows that linear UHMW polyethylene advantageously improves processability of polyethylene without significantly impacting its mechanical properties as a composite (for example, a blown film) when used in certain amounts. Moreover, addition of the linear UHMW polyethylene provides a means to change such properties on a continuous scale, based on real-time needs, which is conventionally not possible due to the availability of only discrete polyethylene grades. Furthermore, the disclosure shows a different set of relationships between processability and properties, compared to those available from conventional polyethylenes and their blends with conventional branched LDPE, which allows for new and advantageous properties of the fabricated articles.

For purposes of this disclosure, an ethylene polymer having a density of about 0.86 g/cm$^3$. An ethylene polymer having a density of about 0.86 g/cm$^3$ or less is referred to as an ethylene elastomer or elastomer; an ethylene polymer having a density of more than about 0.86 g/cm$^3$ to less than about 0.910 g/cm$^3$ is referred to as an ethylene plastomer or plastomer; an ethylene polymer having a density of about 0.910 g/cm$^3$ to about 0.940 g/cm$^3$ is referred to as a linear low density polyethylene; and an ethylene polymer having a density of more than about 0.940 g/cm$^3$ is referred to as a high density polyethylene (HDPE). For these definitions, density is determined using the method described under Test Methods below.

For purposes of this disclosure, and the claims thereto, an ethylene polymer having a Mw above 500,000 is referred to as an ultra-high molecular weight (UHMW) polymer.

Polyethylene in an overlapping density range, i.e. about 0.890 to about 0.930 g/cm$^3$, typically from about 0.915 to about 0.930 g/cm$^3$, which is linear and does not contain long chain branching is referred to as "linear low density polyethylene" (LLDPE) and can be produced with conventional Ziegler-Natta catalysts, such as metallocene catalysts, or vanadium catalysts in gas phase reactors and/or in slurry reactors and/or with any of the disclosed catalysts in solution reactors.

Composition Distribution Breadth Index (CDBI) is a measure of the composition distribution of monomer within the polymer chains and is measured by the procedure described in PCT Publication No. WO 93/03093, published Feb. 18, 1993, specifically 5 columns 7 and 8 as well as in Wild et al, *J. Poly. Sci.*, Poly. Phys. Ed., Vol. 20, p. 441 (1982) and U.S. Pat. No. 5,008,204, including fractions having a weight average molecular weight (Mw) below 15,000 are ignored when determining CDBI.

For purposes herein, the numbering scheme for the Periodic Table Groups is used as described in CHEMICAL AND ENGINEERING NEWS, 63(5), pg. 27 (1985). For example, a "Group 4 metal" is an element from Group 4 of the Periodic Table, e.g., Hf, Ti, or Zr.

As used herein, an "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the monomer ("mer") unit in the copolymer is derived from ethylene in the polymerization reaction and said derived units are present at 35 wt % to 55 wt %, based upon the weight of the copolymer.

A "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers.

For purposes of this disclosure, ethylene shall be considered an alpha-olefin.

As used herein, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Copolymers (and terpolymers) of polyolefins have a comonomer, such as propylene, incorporated into the polyethylene backbone. These copolymers (and terpolymers) provide varying physical properties compared to polyethylene alone and are typically produced in a low pressure reactor, utilizing, for example, solution, slurry, or gas phase polymerization processes. The comonomer content of a polyolefin (e.g., wt % of comonomer incorporated into a polyolefin backbone) influences the properties of the polyolefin (and composition of the copolymers) and is dependent on the identity of the polymerization catalyst.

As used herein, composition includes components of the composition and/or reaction products thereof. Compositions can include blends and films, and those terms can be used interchangeably.

As used herein, the compositions include at least a first polyethylene component and a second polyethylene. The second polyethylene component is a linear UHMW polyethylene (also referred to as a "UHMW-PE", or a "UHMW polyethylene", or a "linear UHMW polyethylene"). It will be realized that the classes of materials described herein that are useful as a second polyethylene can be utilized alone or admixed with other second polyethylenes described herein in order to obtain desired properties.

"Linear" means that the polymer has few, if any, long chain branches and typically has a g'vis value of about 0.97 or above, such as about 0.98 or above.

The term "cyclopentadienyl" refers to a 5-member ring having delocalized bonding within the ring and typically being bound to M through if-bonds, carbon typically making up the majority of the 5-member positions.

As used herein, a "catalyst" includes a single catalyst, or multiple catalysts with each catalyst being conformational isomers or configurational isomers. Conformational isomers include, for example, conformers and rotamers. Configurational isomers include, for example, stereoisomers.

The term "complex," may also be referred to as catalyst precursor, precatalyst, catalyst, catalyst compound, transition metal compound, or transition metal complex. These words are used interchangeably. Activator and cocatalyst are also used interchangeably.

Unless otherwise indicated, the term "substituted" generally means that a hydrogen of the substituted species has been replaced with a different atom or group of atoms. For example, methyl-cyclopentadiene is cyclopentadiene that has been substituted with a methyl group. Likewise, picric acid can be described as phenol that has been substituted with three nitro groups, or, alternatively, as benzene that has been substituted with one hydroxy and three nitro groups.

The following abbreviations may be used herein: dme is 1,2-dimethoxyethane, Me is methyl, Et is ethyl, Pr is propyl, cPr is cyclopropyl, nPr is normal propyl, iPr is isopropyl, Bu is butyl, nBu is normal butyl, iBu is isobutyl, sBu is sec-butyl, tBu is tert-butyl, p-tBu is para-tert-butyl, Ph is phenyl, Bn is benzyl (i.e., $CH_2Ph$), Oct is octyl, Cy is cyclohexyl, TMS is trimethylsilyl, TIBAL is triisobutylaluminum, TNOAL is tri(n-octyl)aluminum, MAO is methylalumoxane, p-Me is para-methyl, THF (also referred to as thf) is tetrahydrofuran, RT is room temperature (and is 23° C. unless otherwise indicated), tol is toluene, and EtOAc is ethyl acetate.

An "anionic ligand" is a negatively charged ligand that donates one or more pairs of electrons to a metal ion. A "neutral donor ligand" is a neutrally charged ligand which donates one or more pairs of electrons to a metal ion.

As used herein, a "catalyst system" includes at least one catalyst compound and a support material. A catalyst system of the present disclosure can further include an activator and an optional co-activator. For the purposes of this disclosure and claims thereto, when a catalyst is described as comprising neutral stable forms of the components, it is well understood by one of ordinary skill in the art, that the ionic form of the component is the form that reacts with the monomers to produce polymers. Furthermore, catalysts of the present disclosure represented by a Formula are intended to embrace ionic forms thereof of the compounds in addition to the neutral stable forms of the compounds. Furthermore, activators of the present disclosure are intended to embrace ionic/reaction product forms thereof of the activator in addition to ionic or neutral form.

A scavenger is a compound that can be added to a reactor to facilitate polymerization by scavenging impurities. Some scavengers may also act as chain transfer agents. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound. Examples of scavengers include trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride.

As used herein, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may include at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and their substituted analogues. Substituted hydrocarbyl radicals are radicals in which at least one hydrogen atom of the hydrocarbyl radical has been substituted with at least one halogen (such as Br, Cl, F or I) or at least one functional group such as $C(O)R^*$, $C(O)NR^*_2$, $C(O)OR^*$, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, and $PbR^*_3$ (where $R^*$ is independently a hydrogen or hydrocarbyl radical, and two or more $R^*$ may join together to form a substituted or unsubstituted saturated, partially unsaturated or aromatic cyclic or polycyclic ring structure), or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include ethenyl, propenyl, allyl, 1,4-butadienyl cyclopropenyl, cyclobutenyl, cyclopentenyl, cyclohexenyl, cyclooctenyl, including their substituted analogues.

The term "alkoxy" or "alkoxide" means an alkyl ether or aryl ether radical wherein the term alkyl is as defined above. Examples of suitable alkyl ether radicals include methoxy, ethoxy, n-propoxy, iso-propoxy, n-butoxy, iso-butoxy, sec-butoxy, tert-butoxy, and phenoxyl.

The term "aryl" or "aryl group" includes a $C_4$-$C_{20}$ aromatic ring, such as a six carbon aromatic ring, and the substituted variants thereof, including phenyl, 2-methylphenyl, xylyl, 4-bromo-xylyl. Likewise heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, iso-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

As used herein the term "aromatic" also refers to pseudo-aromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example a continuous process to produce a polymer would be one where the reactants are continually introduced into one or more reactors and polymer product is continually withdrawn during a polymerization process.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res., 2000, Vol. 29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as about 0 wt %.

As used herein the term "slurry polymerization process" means a polymerization process where a supported catalyst is employed and monomers are polymerized on the supported catalyst particles. At least about 95 wt % of polymer products derived from the supported catalyst are in granular form as solid particles (not dissolved in the diluent).

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of $gPgcat^{-1}h^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mol (or mmol) of catalyst (cat) used (kgP/molcat or gP/mmolCat), and catalyst activity can also be expressed per unit of time, for example, per hour (hr).

Herein, "catalyst" and "catalyst complex" are used interchangeably.

First Polyethylene

In some embodiments, the first polyethylene component is an ethylene homopolymer, ethylene copolymer, and/or blends thereof. Useful copolymers comprise one or more comonomers in addition to ethylene and can be a random copolymer, a statistical copolymer, a block copolymer, and/or blends thereof. In particular, the blends described herein may be physical blends or in situ blends of more than one type of ethylene polymer or blends of ethylene polymers with polymers other than ethylene polymers where the ethylene polymer component is the majority component (e.g. greater than about 50 wt %).

The method of making the first polyethylene can be by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In at least one embodiment, the polyethylenes are made by the catalysts, activators and processes described in U.S. Pat. Nos. 6,342,566; 6,384,142; 5,741,563; PCT Publication Nos. WO 03/040201; and WO 97/19991. Such catalysts are well known in the art, and are described in, for example, ZIEGLER CATALYSTS (Gerhard Fink, Rolf Mulhaupt and Hans H. Brintzinger, eds., Springer-Verlag 1995); Resconi et al.; and I, II METALLOCENE-BASED POLYOLEFINS (Wiley & Sons 2000).

First polyethylenes can include those sold by ExxonMobil Chemical Company in Houston Tex., including those sold as ExxonMobil LLDPE, and ExxonMobil LDPE; and those sold under the ENABLE™, EXACT™ and EXCEED™ trade names. Other first polyethylenes include those sold under the Dow Elite™ trade name.

First polyethylenes can have:
1) an Mw of about 20,000 g/mol or more, about 20,000 g/mol to about 1,000,000 g/mol, such as about 30,000 g/mol to about 500,000 g/mol, such as about 40,000 to about 400,000 g/mol, such as about 50,000 g/mol to about 300,000 g/mol, as measured by size exclusion chromatography according to the procedure described in the Test Methods section below; and/or
2) an Mw/Mn of greater than about 1, such as about 1 to about 40, such as about 1.5 to about 20, such as about 1.8 to about 10, such as about 1.8 to about 6, as measured by size exclusion chromatography as described in the Test Methods section below; and/or
3) a $T_m$ of about 30° C. to about 150° C., such as about 30° C. to about 140° C., such as about 50° C. to about 140° C., such as about 60° C. to about 135° C. as determined by the DSC method described in the Test Methods section below; and/or
4) a crystallinity of about 1% to about 80%, such as about 10% to about 70%, such as about 20% to about 60% (alternately, the first polyethylene may have a crystallinity of at least about 30%, such as at least about 40%, alternately at least about 50%), where crystallinity is determined by the DSC method described in the Test Methods section below; and/or
5) a heat of fusion of about 300 J/g or less, such as about 1 to about 260 J/g, such as about 5 to about 240 J/g, such as about 10 to about 200 J/g as measured by the DSC method described in the Test Methods section below; and/or
6) a crystallization temperature (Tc) of about 0° C. to about 150° C., such as about 20° C. to about 120° C., such as about 25° C. to about 110° C., such as about 60° C. to about 125° C., as measured by the method described in the Test Methods section below; and/or
7) a heat deflection temperature of about 30° C. to about 120° C., such as about 40° C. to about 100° C., such as about 50° C. to about 80° C. as measured according to ASTM D648 on injection molded flexure bars, at 66 psi load (455 kPa); and/or
8) a Shore hardness (D scale) of about 10 or more, such as about 20 or more, such as about 30 or more, such as about 40 or more, such as about 100 or less, such as from about 25 to about 75 (as measured by ASTM D 2240); and/or
9) a percent amorphous content of at least about 50%, alternately at least about 60%, alternately at least about 70%, even alternately between about 50% and about 95%, or about 70% or less, such as about 60% or less, such as about 50% or less as determined by subtracting the percent crystallinity from 100; and/or
10) a branching index (g'vis) of about 0.97 or more, such as about 0.98 or more, such as about 0.99 or more, such as about 1, as measured using the method described in the Test Methods section below; and/or 11) a density of about 0.86 to about 0.98 g/cm$^3$ (such as from about 0.88 to about 0.94 g/cm$^3$, such as from about 0.90 to about 0.935 g/cm$^3$, such as from about 0.91 to about 0.93 g/cm$^3$) (alternately from about 0.85 to about 0.97 g/cm$^3$, such as about 0.86 to about 0.965 g/cm$^3$, such as about 0.88 to about 0.96 g/cm$^3$, alternately between about 0.86 and about 0.91 g/cm$^3$, alternately between about 0.91 and about 0.96 g/cm$^3$, or alternately between about 0.94 to about 0.965 g/cm$^3$) (determined according to ASTM D 1505 using a density-gradient column on a compression-molded specimen that has been slowly cooled to room temperature (i.e. over a period of about 10 minutes or more) and allowed to age for a sufficient time that the density is constant within about +/−0.001 g/cm$^3$); and or 12) a composition distribution breadth index (CDBI) of about 60% or more, such as about 60% to about 80%, such as about 65% to about 80%; and/or 13) a melt index (MI) of a first polyethylene, as measured according to ASTM D1238 (190° C., 2.16 kg), ranging from about 0.02 dg/min to about 800 dg/min, such as about 0.05 to about 500 dg/min, such as from about 0.1 to about 100 dg/min. In some embodiments, the first polyethylene has a MI of about 20 dg/min or less, such as about 7 dg/min or less, such as about 5 dg/min or less, such as about 2 dg/min or less; and/or 14) a Mooney viscosity, ML(1+4) @ 125° C. (measured according to ASTM D1646) of about 100 MU or less, such as about 75 MU or less, such as about 60 MU or less, such as about 30 MU or less; and/or 15) a 1% secant flexural modulus of a first polyethylenes ranges from about 5 MPa to about 1000 MPa, such as from about 10 MPa to about 800 MPa, such as from about 5 MPa to about 200 MPa, wherein a desirable polymer may exhibit any combination of any upper flexural modulus limit with any lower flexural modulus limit.

16) a melt strength greater than about 1 MN, such as greater than about 5 MN, such as greater than about 10 MN, such as greater than about 15 MN, such as greater than about 20 MN. Alternately, a melt strength between about 1 mN and about 20 MN, such as between about 5 mN and about 20 MN, such as between about 10 mN and about 20 mN, such as between about 15 mN and about 20 mN.

In some embodiments, the first polyethylene is an ethylene copolymer, either random, or block, of ethylene and one or more comonomers is $C_3$ to $C_{40}$ alpha-olefins (such as $C_3$ to $C_{20}$ alpha-olefins, such as $C_3$ to $C_{10}$ alpha-olefins, such as butene, hexene, or octene). The first polyethylene can be a copolymer comprising at least 50 wt % ethylene. The comonomers can be present from about 0.1 wt % to about 50 wt % of the copolymer, such as from about 0.5 wt % to about 30 wt %, such as from about 1 wt % to about 15 wt %, such as from about 0.1 wt % to about 5 wt %, wherein a desirable copolymer comprises ethylene and $C_3$ to $C_{20}$ alpha-olefin derived units in any combination of any upper wt % limit with any lower wt % limit described herein.

In some embodiments, the first polyethylene comprises less than about 20 mol % propylene units (such as less than about 15 mol %, such as less than about 10 mol %, such as less than about 5 mol %, alternately about 0 mol % propylene units).

In some embodiments, the first polyethylene useful herein is produced by polymerization of ethylene and, optionally, an alpha-olefin with a catalyst having as a transition metal component a bis(n-$C_{3-4}$alkyl cyclopentadienyl) hafnium compound, wherein the transition metal component preferably comprises from about 95 mol % to about 99 mol % of the hafnium compound as further described in U.S. Pat. No. 9,956,088.

In some embodiments, the first polyethylene comprises ethylene and one or more other monomers selected from $C_3$ to $C_{20}$ linear, branched or cyclic monomers, and in some embodiments is a $C_3$ to $C_{12}$ linear or branched alpha-olefin, such as butene, pentene, hexene, heptene, octene, nonene, decene, dodecene, 4-methyl-pentene-1, 3-methyl pentene-1, 3,5,5-trimethyl-hexene-1.

Linear alpha-olefins useful as comonomers for the first polyethylene can include $C_3$ to $C_8$ alpha-olefins, such as 1-butene, 1-hexene, and 1-octene, such as 1-hexene. Branched alpha-olefins can include 4-methyl-1-pentene, 3-methyl-1-pentene, and 3,5,5-trimethyl-1-hexene, 5-ethyl-1-nonene. Aromatic-group-containing monomers can contain up to 30 carbon atoms. Suitable aromatic-group-containing monomers can comprise at least one aromatic structure, such as from one to three, such as a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including $C_1$ to $C_{10}$ alkyl groups. Additionally, two adjacent substitutions may be joined to form a ring structure. Aromatic-group-containing monomers can contain at least one aromatic structure appended to a polymerizable olefinic moiety. Particularly, aromatic monomers can include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Diolefin monomers useful for the first polyethylene can include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diolefin monomers can be alpha, omega-diene monomers (i.e. di-vinyl monomers). The diolefin monomers can be linear di-vinyl monomers, such as those containing from 4 to 30 carbon atoms. Dienes can include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene. Dienes can include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than about 1000 g/mol). Cyclic dienes can include cyclopentadiene, vinylnorbornene, norbomadiene, ethylidene norbomene, divinylbenzene, dicyclopentadiene or higher ring containing diolefins with or without substituents at various ring positions.

In at least one embodiment, one or more dienes are present in the first polyethylene at up to about 10 wt %, such as at about 0.00001 wt % to about 2 wt %, such as about 0.002 wt % to about 1 wt %, such as about 0.003 wt % to about 0.5 wt %, based upon the total weight of the composition. In some embodiments, about 500 ppm or less of diene is added to the polymerization, such as about 400 ppm or less, such as about 300 ppm or less. In some embodiments, at least about 50 ppm of diene is added to the polymerization, or about 100 ppm or more, or about 150 ppm or more.

In some embodiments, the first polyethylene used herein is a plastomer having a density of 0.91 g/cm³ or less, as determined by ASTM D1505, and a melt index (MI) between 0.1 and 50 dg/min, as determined by ASTM D1238 (190° C., 2.16 kg). In some embodiments, the plastomers:

1) are copolymers of ethylene and at least one $C_3$ to $C_{12}$ alpha-olefin, such as $C_4$ to $C_8$ alpha-olefins, with the amount of $C_3$ to $C_{12}$ alpha-olefin present in the plastomer ranges from about 2 wt % to about 35 wt %, such as from about 5 wt % to about 30 wt %, such as from about 15 wt % to about 25 wt %, such as from about 20 wt % to about 30 wt %; and/or
2) have a melt index of between about 0.1 and about 40 dg/min, such as from about 0.2 to about 20 dg/min, such as from about 0.5 to about 10 dg/min; and/or
3) have an average molecular weight of from about 10,000 to about 800,000 g/mol, such as from about 20,000 to about 700,000 g/mol; and/or
4) have a molecular weight distribution (Mw/Mn) from about 1.5 to about 5.0, such as from about 2.0 to about 4.0; and/or
5) have a 1% secant flexural modulus (ASTM D790A Flexural properties at room temperature are determined according to ASTM D790A), —test specimen geometry was as specified under the ASTM D790 section "Molding Materials (Thermoplastics and Thermosets)," and the support span was 2 inches (5.08 cm)) of plastomers ranges from about 5 MPa to about 100 MPa, such as from about 10 MPa to about 50 MPa; and/or
6) have a melting temperature (Tm) of from about 30° C. to about 100° C., such as from about 40° C. to about 80° C.; and/or
7) have a degree of crystallinity of plastomers between about 3% and about 30%; and/or
8) are synthesized using a single-site catalyst, such as a metallocene catalyst, and comprise copolymers of ethylene and higher alpha-olefins such as propylene, 1-butene, 1-hexene and 1-octene, and which contain enough of one or more of these comonomer units to yield a density between about 0.86 and about 0.91 g/cm³.

Examples of commercially available plastomers are EXACT™ 4150, a copolymer of ethylene and 1-hexene, the 1-hexene derived units making up from about 18 wt % to about 22 wt % of the plastomer and having a density of about 0.895 g/cm³ and MI of about 3.5 dg/min (ExxonMobil Chemical Company, Houston, Tex.); and EXACT™ 8201, a copolymer of ethylene and 1-octene, the 1-octene derived units making up from about 26 wt % to about 30 wt % of the plastomer, and having a density of about 0.882 g/cm³ and MI of about 1.0 dg/min (ExxonMobil Chemical Company, Houston, Tex.).

In at least one embodiment, the first polyethylenes are metallocene polyethylenes (mPEs).

Further useful mPEs include those described in U.S. Publication No. 2007/0260016 and U.S. Pat. No. 6,476,171, e.g. copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum, trimethylaluminum, tri-isobutyl aluminum, tri-n-hexylaluminum), which polymer has a Melt Index of from about 0.1 to about 15 (ASTM D 1238, condition E); a CDBI of at least about 70%, a density of from about 0.910 to about 0.930 g/cm³; a Haze (ASTM D1003) value of less than 20; a Melt Index ratio (I21/I11, ASTMD 1238) of from about 35 to about 80; an averaged Modulus (M) (as defined in U.S. Pat. No. 6,255,426) of from about 20,000 to about 60,000 psi (about 13790 to about 41369 N/cm²) and a relation between M and the Dart Impact Strength (26 inch, ASTM D 1709) in g/mil (DIS) complying with the formula:

$$DIS \geq 0.8*[100+e^{(11.71-0.000268*M+2.183*10^{-9}*M^2)}],$$

where "e" represents 2.1783, the base Napierian logarithm, M is the averaged Modulus in psi, and DIS is the 26 inch (66 cm) dart impact strength.

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Texas under the trade name EXCEED™ Polyethylene or ENABLE™ Polyethylene.

Second Polyethylene

Second polyethylenes typically have:
1) at least about 50 mol % ethylene (such as at least about 70 mol % or more, such as at least about 90 mol % or more), and one or more $C_3$ (such as $C_6$) to $C_{40}$ comonomers (such as about 50 mol % or less, such as about 30 mol % or less, such as from about 0.5 to about 30 mol %, such as from about 1 to about 25 mol %). In some embodiments, the one or more $C_3$ to $C_{40}$ comonomers of the second polyethylene are butene, hexene, and octene. Other comonomers are described herein; and/or
2) an Mw of about 500,000 g/mol or more (such as about 1,000,000 g/mol or more, such as about 1,500,000 g/mol or more, such as 4,000,000 up to 8,000,000); and/or
3) an Mw/Mn of about 1.0 or more (such as about 2.0 or more, such as 3.0 or more, such as about 4.0 or more, such as about 5.0 or more, such as about 6.0 or more, such as about 7.0 or more, such as about 8.0 or more, such as from about 2.0 to about 40); and/or
4) a density in a range of from about 0.840 g/cm³ to about 0.960 g/cm³, such as from about 0.850 g/cm³ to about 0.95 g/cm³, such as from about 0.850 g/cm³ to about 0.920 g/cm³, such as from about 0.860 g/cm³ to about 0.930 g/cm³, such as from about 0.870 g/cm³ to about 0.92 g/cm³, such as less than about 0.925 g/cm³, such as less than about 0.920 g/cm³, such as less than about 0.900 g/cm³. Alternately, the second polyethylene has a density in a range from about 0.910 g/cm³ to about 0.960 g/cm³.

In at least one embodiment, a second polyethylene is a linear UHMW polyethylenes.

The second polyethylene used herein preferably exhibits shear thinning. Shear thinning is characterized by the decrease of the complex viscosity with increasing shear rate. Shear thinning can be characterized using a shear thinning index. The term "shear thinning index" is determined using plots of the logarithm (base ten) of the dynamic viscosity versus logarithm (base ten) of the frequency. The slope is the difference in the log (dynamic viscosity) at a frequency of 100 rad/s and the log (dynamic viscosity) at a frequency of 0.01 rad/s divided by 4. These plots are the typical output of small amplitude oscillatory shear (SAOS) experiments. For purposes of this disclosure, the SAOS test temperature is 190° C. for ethylene polymers. Polymer viscosity is conveniently measured in Pascal·seconds (Pa·s) at shear rates within a range of from 0.01 to 398 rad/sec and at 190° C. under a nitrogen atmosphere using a dynamic mechanical spectrometer, such as the Advanced Rheometrics Expansion System (ARES). These types of second polyethylenes are easily processed in high shear rate fabrication methods, such as injection molding.

In some embodiments, the second polyethylene has a composition distribution breadth index of at least about and/or a melt index (ASTM 1238, 190° C., 2.16 kg) comparable to the first polyethylene.

An example of a second polyethylene that can be used is a high density commercial resin (GUR4120, Ticona). Other commercial polyethylene and resins that fall within the following attributes can be used for the compositions described herein.

Polymerization Processes to Produce the Second Polyethylene

The second polyethylene described herein may be produced using a catalyst and activator as described below in a high pressure, solution, gas, or slurry polymerization process, or a combination thereof, such as a solution phase or gas phase polymerization process. In some embodiments, a method of polymerizing olefins to produce at least one polyolefin composition is provided.

The polymerization reactions involve the polymerization of ethylene and one or more $C_3$ to $C_{40}$ comonomers, such as $C_4$ to $C_{20}$ comonomers, and such as $C_4$ to $C_8$ comonomers. These comonomers can be alpha-olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. Comonomers can include one or more of propylene, butene, pentene, hexene, heptene, octene, nonene, decene, undecene, dodecene, 4-methylpentene-1, 3-methylpentene-1, 5-ethylnonene-1, and cyclic olefins or a combination thereof.

The catalysts and catalyst systems described herein are useful in polymerizing unsaturated monomers conventionally known to undergo transition metal catalyzed polymerization such as solution, slurry, gas-phase, and high-pressure polymerization. Typically one or more of the supported catalysts described herein, one or more activators, and one or more monomers are contacted to produce polymer. In some embodiments, the complexes may be supported and as such will be particularly useful in the known, fixed-bed, moving-bed, fluid-bed, slurry, solution, or bulk operating modes conducted in single, series, or parallel reactors.

One or more reactors in series or in parallel may be used. The complexes, chain transfer agent, activator, and when desired, co-activator, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to a first reactor and another component to other reactors. In one embodiment, the complex is activated in the reactor in the presence of olefin.

In at least one embodiment, the polymerization process is a continuous process.

In some embodiments, 500 ppm or less of hydrogen is added to the polymerization, or 400 ppm or less, or 300 ppm or less. In some embodiments, at least 50 ppm of hydrogen is added to the polymerization, or 100 ppm or more, or 150 ppm or more.

In some embodiments, the disclosure also relates to a process to produce the second polyethylene comprising contacting a catalyst, activator, ethylene, $C_3$ to $C_{40}$ alpha-olefin and obtaining a polymer.

Gas phase polymerization, particularly a fluidized bed process, can be used to prepare the second polyethylene described herein. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference).

Slurry phase polymerization, particularly a slurry loop process, can be used to prepare the second polyethylene described herein. A slurry polymerization process generally operates between about 1 to about 50 atmosphere pressure range (about 15 psi to about 735 psi, about 103 kPa to about 5068 kPa) or even greater and temperatures in the range of about 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, such as a branched alkane. The medium employed should be liquid under the conditions of polymerization and relatively inert. When a propane medium is used the process must be operated above the reaction diluent critical temperature and pressure. A hexane or an isobutane medium can be used.

In some embodiments, a polymerization technique is referred to as a particle form polymerization or a slurry process where the temperature is kept below the temperature at which the polymer goes into solution. Such technique is well known in the art, and described in, for instance, U.S. Pat. No. 3,248,179 which is fully incorporated herein by reference. The temperature in the particle form process can be within the range of about 85° C. to about 110° C. Two polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

Particle form polymerization has advantages over solution process for production of second polyethylene. The polymer chains produced are present in discrete granular form and thus prevent many polymer chains from cross-linking together and forming reactor gels.

In some embodiments, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. In some embodiments, about 500 ppm or less of hydrogen is added, or about 400 ppm or less or about 300 ppm or less. In some embodiments, at least about 50 ppm of hydrogen is added, or about 100 ppm or more, or about 150 ppm or more.

The reactor is maintained at a pressure of about 3620 kPa to about 4309 kPa and at a temperature in the range of about 60° C. to about 120° C., such as up to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the diluent and all unreacted monomer and comonomers. The resulting hydrocarbon free powder is then compounded for use in various applications.

In some slurry process embodiments, the concentration of predominant monomer in the reactor liquid medium is in the range of from about 1 wt % to about 30 wt %, such as from about 1 wt % to about 10 wt %, such as from about 2 wt % to about 7 wt %, such as from about 2.5 wt % to about 6 wt %, such as from about 3 wt % to about 6 wt %.

Another process useful for embodiments described herein is where the process, such as a slurry process, is operated in the absence of or essentially free of any scavengers, such as triethylaluminum, trimethylaluminum, tri-isobutylaluminum and tri-n-hexylaluminum and diethyl aluminum chloride, and dibutyl zinc. This process is described in PCT Publication No. WO 96/08520 and U.S. Pat. No. 5,712,352, which are herein fully incorporated by reference.

In some embodiments, the process is run with scavengers. Typical scavengers include trimethyl aluminum, tri-isobutyl aluminum and an excess of alumoxane or modified alumoxane.

In some embodiments, homogeneous polymerization, particularly a bulk or solution phase process, can be used to prepare the second polyethylene described herein. Generally this involves polymerization in a continuous reactor in which the polymer formed and the starting monomer and catalyst materials supplied are agitated to reduce or avoid concentration gradients. Suitable processes operate above the melting point of the polymers at high pressures, from about 1 bar to about 3000 bar (0.1 MPa to 300 MPa), in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature can vary between about 30° C. and about 160° C., such as from about 90° C. to about 150° C., such as from about 100° C. to about 140° C. Polymerization temperature may vary depending on catalyst choice. In series operation, the second reactor temperature is preferably higher than the first reactor temperature. In parallel reactor operation, the temperatures of the two reactors are independent. The pressure can vary from about 1 mm Hg to about 2500 bar (about 250 MPa), such as from about 0.1 bar to about 1600 bar (about 0.1 MPa to about 160 MPa), such as from about 1.0 bar to about 500 bar about (0.1 MPa to about 50 MPa).

In some embodiments, about 500 ppm or less of hydrogen is added to the polymerization, or about 400 ppm or less, or about 300 ppm or less. In some embodiments, at least about 50 ppm of hydrogen is added to the polymerization, or about 100 ppm or more, or about 150 ppm or more.

Each of these processes may also be employed in single reactor, parallel or series reactor configurations. The liquid processes comprise contacting olefin monomers with the above described catalyst systems in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See also, PCT Application Nos. WO 96/33227 and WO 97/22639. All documents are incorporated by reference for U.S. purposes for description of polymerization processes, metallocene selection and useful scavenging compounds.

The polymerization can be conducted in a continuous, stirred tank reactor. Tubular reactors equipped with the hardware to introduce feeds, catalysts and scavengers in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. Hydrocarbon liquids can include both aliphatic and aromatic fluids such as desulphurized light virgin naphtha and alkanes, such as propane, isobutane, mixed butanes, hexane, pentane, isopentane, isohexane, cyclohexane, isooctane, and octane. In some embodiments, a perfluorocarbon or hydrofluorocarbon is used as the solvent or diluent.

Suitable conditions for polymerization include a temperature from about 50° C. to about 250° C., such as from about 50° C. to about 150° C., for example from about 70° C. to about 150° C. and a pressure of about 0.1 MPa or more, such as about 2 MPa or more. The upper pressure limit is not critically constrained but is typically about 200 MPa or less, such as about 120 MPa or less, except when operating in supercritical phase then the pressure and temperature are above the critical point of the reaction media in question (typically over about 95° C. and about 4.6 MPa for propylene polymerizations). For more information on running supercritical polymerizations, see PCT Publication No. WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

A polymer can be recovered from the effluent of either the first polymerization step or the second polymerization step by separating the polymer from other constituents of the effluent using conventional separation means. For example, polymer can be recovered from either effluent by coagulation with a non-solvent, such as methanol, isopropyl alcohol, acetone, or n-butyl alcohol, or the polymer can be recovered by stripping the solvent or other media with heat or steam. One or more conventional additives, such as antioxidants, can be incorporated in the polymer during the recovery procedure. Possible antioxidants include phenyl-beta-naphthylamine, di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of lower critical solution temperature (LCST) followed by devolatilization, are also envisioned. The catalyst may be deactivated as part of the separation procedure to reduce or eliminate further uncontrolled polymerization downstream in the polymer recovery processes. Deactivation may be effected by mixing with suitable polar substances such as water, whose residual effect following recycle can be counteracted by suitable sieves or scavenging systems.

Catalysts

Suitable catalysts for producing the second polyethylene are those capable of polymerizing a $C_2$ to $C_{40}$ olefin to produce an ethylene copolymer. These include both metallocene and Ziegler-Natta catalysts. The catalysts can be in the form of a homogeneous solution, supported, or a combination thereof. In case two catalysts are employed in the same reaction zone, for example, at least one of the catalyst is able to incorporate more comonomer (such as butene, hexene, or octene) than other catalysts so that the polymers produced will have different densities. A wide variety of transition metal compounds are known that, when activated with a suitable activator, will have poor alpha-olefin incorporation and hence will produce higher density ethylene copolymers.

Metallocene catalyst compounds are generally described in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV., p. 243-2% (1999) and in particular, for use in the synthesis of polyethylene in 1 METALLOCENE-BASED POLYOLEFINS, p. 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components".

The Cp ligands are typically pi-bonded and/or fused ring(s) or ring systems. The ring(s) or ring system(s) typically include Group 13 to Group 16 atoms, and the atoms that make up the Cp ligands are carbon, nitrogen, oxygen, silicon, sulfur, phosphorous, germanium, boron, aluminum, and combinations thereof, wherein carbon makes up at least 50% of the ring members. Even more particularly, the Cp ligand(s) include substituted and unsubstituted cyclopentadienyl ligands and ligands isolobal to cyclopentadienyl, non-limiting examples of which include cyclopentadienyl, indenyl, fluorenyl, and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g. 4,5,6,7-tetrahydroindenyl, or "$H_4Ind$"), substituted versions thereof, and heterocyclic versions thereof. In some embodiments, the metallocenes include one or two (such as two) of the same or different Cp rings of cyclopentadienyl, indenyl, fluorenyl, tetrahydroindenyl, or substituted versions thereof.

The metal atom "M" of the metallocene catalyst compound, as described throughout the specification and claims, is a Group 3 through Group 12 atoms and lanthanide Group atoms in one embodiment (such as Groups 3 through Group 10 atoms, such as Sc, Ti, Zr, Hf, V, Nb, Ta, Mn, Re, Fe, Ru, Os, Co, Rh, Ir, and Ni, such as Groups 4, 5, and 6 atoms, such as Ti, Zr, Hf atoms, such as Zr).

In some embodiments, the oxidation state of the metal atom "M" may range from 0 to +7, such as +1, +2, +3, +4, or +5, such as +2, +3, or +4. The groups bound to M are such that the compounds described below in the formulas and structures are electrically neutral, unless otherwise indicated. The Cp ligand(s) form at least one chemical bond with M to form the "metallocene catalyst compound". The Cp ligands are distinct from the leaving groups bound to the catalyst compound in that they are not highly susceptible to substitution/abstraction reactions.

In some embodiments, the one or more metallocene catalyst components are represented by the formula (I):

$$Cp^A Cp^B MX_n \qquad (I),$$

wherein M is as described above; each X is chemically bonded to M; each Cp group is chemically bonded to M; and n is 0, 1, 2, 3, or 4 (such as 1 or 2). The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In some embodiments, $Cp^A$ and $Cp^B$ are independently cyclopentadienyl, indenyl, tetrahydroindenyl, fluorenyl, and substituted derivatives of each. Independently, each $Cp^A$ and $Cp^B$ of formula (I) may be unsubstituted or substituted with any one or combination of substituent groups R. Non-limiting examples of substituent groups R as used in formula (I) as well as ring substituents include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, arylaminos, and combinations thereof. More particular non-limiting examples of alkyl substituents R associated with formula (I) through (IV) (discussed below) include methyl, ethyl, propyl, butyl, pentyl, hexyl, cyclopentyl, cyclohexyl, benzyl, phenyl, methylphenyl, and tert-butylphenyl groups, including all their isomers, for example tertiary-butyl, and isopropyl. Other possible radicals include substituted alkyls and aryls, such as, for example, fluoromethyl, fluoroethyl, difluoroethyl, iodopropyl, bromohexyl, chlorobenzyl, and hydrocarbyl substituted organometalloid radicals including trimethylsilyl, trimethylgermyl, and methyldiethylsilyl; halocarbyl-substituted organometalloid radicals including tris(trifluoromethyl)silyl, methylbis(difluoromethyl)silyl, and bromomethyldimethylgermyl; disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide, and ethylsulfide. Other substituents R include olefins, such as, but not limited to, olefinically-unsaturated substituents including vinyl-terminated ligands, for example 3-butenyl, 2-propenyl, and 5-hexenyl. In some embodiments, at least two R groups (such as two adjacent R groups) are joined to form a ring structure having from 3 to 30 atoms of carbon, nitrogen, oxygen, phosphorous, silicon, germanium, aluminum, boron, or combinations thereof. Also, a substituent R group, such as 1-butanyl, may form a bonding association to M.

Non-limiting examples of X groups include alkyls, amines, phosphines, ethers, carboxylates, dienes, hydrocarbon radicals having from 1 to 20 carbon atoms, fluorinated hydrocarbon radicals (e.g. —$C_6F_5$ (pentafluorophenyl)), fluorinated alkylcarboxylates (e.g. $CF_3C(O)O$—), hydrides, halogen ions (such as chlorine or bromine), and combinations thereof. Other examples of X groups include alkyl groups, such as cyclobutyl, cyclohexyl, methyl, heptyl, tolyl, trifluoromethyl, tetramethylene, pentamethylene, methylidene, methoxy, ethoxy, propoxy, phenoxy, bis(N-methylanilide), dimethylamide, and dimethylphosphide radicals. In some embodiments, two or more X groups form a part of a fused ring or ring system.

In some embodiments, the metallocene catalyst component includes those of formula (I) where $Cp^A$ and $Cp^B$ are bridged to each other by at least one bridging group (A) such that the structure is represented by formula (II):

$$Cp^A(A)Cp^B MX_n \qquad (II),$$

These bridged compounds represented by formula (II) are known as "bridged metallocenes". $Cp^A$, $Cp^B$, M. X, and n in formula (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as, but not limited to, at least one of carbon, oxygen, nitrogen, silicon, aluminum, boron, germanium, tin, and combinations thereof, wherein the heteroatom also may be $C_1$ to $C_{12}$ alkyl or aryl substituted to satisfy neutral valency. The bridging group (A) also may contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, R'$_2$C=, R'$_2$Si=, —Si(R')$_2$Si(R'$_2$)—, R'$_2$Ge=, R'P= (wherein "=" represents two chemical bonds), where R' is independently hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, or halogen radical, or wherein two or more R' may be joined to form a ring or ring system. In some embodiments, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl, and the corresponding moieties wherein the Si atom is replaced by a Ge or a C atom.

In some embodiments, bridging group (A) also may be cyclic, comprising, for example 4 to 10 ring members (such as 5 to 7 ring members). The ring members may be selected from the elements mentioned above, from one or more of B, C, Si, Ge, N, and O in a particular embodiment. Non-limiting examples of ring structures which may be present as or part of the bridging moiety are cyclobutylidene, cyclopentylidene, cyclohexylidene, cycloheptylidene, cyclooctylidene, and the corresponding rings where one or two carbon atoms are replaced by at least one of Si, Ge, N, and O (such as at least one of Si and Ge). The bonding arrangement between the ring and the Cp groups may be cis-, trans-, or a combination thereof.

The cyclic bridging groups (A) may be saturated or unsaturated and/or may carry one or more substituents and/or may be fused to one or more other ring structures. If present, the one or more substituents are independently hydrocarbyl (e.g. alkyl, such as methyl) or halogen (e.g. F, Cl) in some embodiments. The one or more Cp groups to which the above cyclic bridging moieties may optionally be fused, may be saturated or unsaturated, and may be selected from the group consisting of those having 4 to 10 (such as 5, 6, or 7) ring members (such as C, N, O, and S) such as, for example, cyclopentyl, cyclohexyl, or phenyl. Moreover, these ring structures may themselves be fused, such as, for example, in the case of a naphthyl group. Moreover, these (optionally fused) ring structures may carry one or more substituents. Illustrative, non-limiting examples of these substituents are hydrocarbyl (such as alkyl) groups and halogen atoms.

The ligands $Cp^A$ and $Cp^B$ of formulae (I) and (II) are different from each other in some embodiments, and the same in some embodiments.

In some embodiments, the metallocene catalyst components include bridged mono-ligand metallocene compounds (e.g. mono-cyclopentadienyl catalyst components). In some embodiments, the at least one metallocene catalyst component is a bridged "half-sandwich" metallocene represented by the formula (III):

$$Cp^A(A)QMX_n \qquad (III),$$

wherein $Cp^A$ is defined above and is bound to M; (A) is a bridging group bonded to Q and $Cp^A$; and wherein an atom from the Q group is bonded to M. In formula (III) above, $Cp^A$, (A), and Q may form a fused ring system. The X groups and n of formula (III) are as defined above in formula (I) and (II). In some embodiments, $Cp^A$ is a cyclopentadienyl, indenyl, tetrahydroindenyl, fluorenyl, substituted versions thereof, or combinations thereof. In formula (III), Q is a heteroatom-containing ligand in which the bonding atom (the atom that is bonded with the metal M) is a Group 15 atom or Group 16 atom, such as nitrogen, phosphorus, oxygen, or sulfur atom, such as nitrogen or oxygen. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene, and other compounds comprising Group 15 and Group 16 atoms capable of bonding with M.

In some embodiments, the at least one metallocene catalyst component may be an unbridged "half sandwich" metallocene represented by the formula (IV):

$$Cp^A MQ_q X_n \qquad (IV),$$

wherein $Cp^A$ is defined as for the Cp groups in (I) and is a ligand that is bonded to M; each Q is independently bonded to M; X is a leaving group as described above in (I); n ranges from 0 to 3, and is 0 or 3 in some embodiments; q ranges from 0 to 3, and is 0 or 3 in some embodiments.

In some embodiments, $Cp^A$ is cyclopentadienyl, indenyl, tetrahydroindenyl, fluorenyl, substituted version thereof, or combinations thereof. In formula (IV), Q is ROO$^-$, RO—, R(O)—, —NR—, —CR$_2$—, —S—, —NR$_2$, —CR$_3$, —SR, —SiR$_3$, —PR$_2$, —H, or substituted and unsubstituted aryl groups, wherein each R is independently $C_1$ to $C_6$ alkyl, $C_6$ to $C_{12}$ aryl, $C_1$ to $C_6$ alkylamine, $C_6$ to $C_{12}$ alkylarylamine, $C_1$ to $C_6$ alkoxy, or $C_6$ to $C_{12}$ aryloxy. Non-limiting examples of Q include $C_1$ to $C_{12}$ carbamates, $C_1$ to $C_{12}$ carboxylates (e.g. pivalate), $C_2$ to $C_{20}$ alkyls, and $C_2$ to $C_{20}$ heteroallyl moieties.

In some embodiments, the metallocene catalyst component is one or more as described in U.S. Pat. Nos. 5,703,187, and 5,747,406, including a dimer or oligomeric structure, such as disclosed in, for example, U.S. Pat. Nos. 5,026,798 and 6,069,213. In some embodiments, the metallocene catalyst component is one or more as described in U.S. Pat. No. 6,069,213.

It is contemplated that the metallocene catalyst components described above include their structural or optical or enantiomeric isomers (racemic mixture), and may be a pure enantiomer in some embodiments. As used herein, a single, bridged, asymmetrically substituted metallocene catalyst component having a racemic and/or meso isomer does not, itself, constitute at least two different bridged, metallocene catalyst components. The "metallocene catalyst component" useful in the present disclosure may comprise any combination of any embodiment described herein.

Particularly useful metallocene catalyst compounds include: dimethylsilyl-bis-(tetrahydroindenyl)zirconium dichloride, dimethylsilyl-bis-(tetrahydroindenyl) zirconium dimethyl, dimethylsilyl-bis-(tetrahydroindenyl)hafnium dichloride, dimethylsilyl-bis-(tetrahydroindenyl)hafnium dimethyl, ethylene(bis-indenyl)zirconium dimethyl, ethylene(bis-indenyl)zirconium dichloride, ethylene(bis-indenyl) hafnium dimethyl, ethylene(bis-indenyl)hafnium dichloride, rac-dimethylsilylbis(indenyl)zirconium dimethyl, rac-dimethylsilylbis(indenyl)zirconium dichloride, rac-dimethylsilylbis(indenyl)hafnium dimethyl, and rac-dimethylsilylbis(indenyl)hafnium dichloride.

Activators

The terms "cocatalyst" and "activator" are used herein interchangeably and are defined to be any compound which can activate any one of the catalyst compounds described above by converting the neutral catalyst compound to a catalytically active catalyst compound cation.

After the complexes have been synthesized, catalyst systems may be formed by combining the complexes with activators in any suitable manner including by supporting them for use in slurry or gas phase polymerization. The catalyst systems may also be added to or generated in solution polymerization or bulk polymerization (in the monomer). The catalyst system typically includes a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Activators typically include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In some embodiments, alumoxane activators are utilized as an activator in the catalyst system. The alkylalumoxane may be used with another activator. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane, and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Another useful alumoxane is solid polymethylaluminoxane as described in U.S. Pat. Nos. 9,340,630; 8,404,880; and 8,975,209.

When the activator is an alumoxane (modified or unmodified), some embodiments include the maximum amount of activator typically at up to about a 5000-fold molar excess Al/M over the catalyst compound (per metal catalytic site). The minimum activator-to-catalyst-compound is about a 1:1 molar ratio. Alternate ranges can include from about 1:1 to about 500:1, alternately from about 1:1 to about 200:1, alternately from about 1:1 to about 100:1, or alternately from about 1:1 to about 50:1. In an alternate embodiment, little or no alumoxane is used in the polymerization processes described herein. Alumoxane can be present at about zero mol %, alternately the alumoxane is present at a molar ratio of aluminum to catalyst compound transition metal less than about 500:1, such as less than about 300:1, such as less than about 100:1, such as less than about 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include aluminum, gold, and platinum. Suitable metalloids include boron, aluminum, phosphorus, and silicon.

"Compatible" non-coordinating anions can be those which are not degraded to neutrality when the initially formed complex decomposes, and the anion does not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (PCT Publication No. WO 98/43983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator.

In at least one embodiment, boron containing NCA activators represented by the formula below can be used:

$$Z_d^+(A^{d-}),$$

where: Z is (L-H) or a reducible Lewis acid; L is a neutral Lewis base; H is hydrogen; (L-H)$^+$ is a Brønsted acid; A$^{d-}$ is a non-coordinating anion, for example a boron containing non-coordinating anion having the charge d−; and d is 1, 2, or 3.

The cation component, $Z_d^+$ may include Brønsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carboniums, ferroceniums and mixtures, such as carboniums and ferroceniums. $Z_d^+$ can be triphenyl carbonium. Reducible Lewis acids can be any triaryl carbonium (where the aryl can be substituted or unsubstituted, such as those represented by the formula: (Ar$_3$C$^+$), where Ar is aryl substituted with a $C_1$ to $C_{40}$ hydrocarbyl or with a substituted $C_1$ to $C_{40}$ hydrocarbyl, or a heteroaryl substituted with a $C_1$ to $C_{40}$ hydrocarbyl, or with a substituted $C_1$ to $C_{40}$ hydrocarbyl; such as the reducible Lewis acids in "Z" include those represented by the formula: (Ph$_3$C), where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation (L-H)$_d^+$, it is preferably a Brønsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component A$^{d-}$ includes those having the formula $[M^{k+}Q_n]^{d-}$ wherein k is 1, 2, or 3; n is 1, 2, 3, 4, 5, or 6 (such as 1, 2, 3, or 4); n−k=d; M is an atom of Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radicals, said Q having up to 20 carbon atoms with the proviso that in not more than 1 occurrence is Q a halide. For example, each Q is a fluorinated hydrocarbyl group having 1 to 20 carbon atoms, such as each Q is a fluorinated aryl group, such as each Q is a pentafluoryl aryl group. Examples of suitable A$^{d-}$ also include diboron compounds as disclosed in U.S. Pat. No. 5,447,895, which is fully incorporated herein by reference.

Examples of boron compounds which may be used as an activating cocatalyst include the compounds described as (and particularly those specifically listed as) activators in U.S. Pat. No. 8,658,556, which is incorporated by reference herein.

Bulky activators are also useful herein as NCAs. "Bulky activator" as used herein refers to anionic activators represented by the formula:

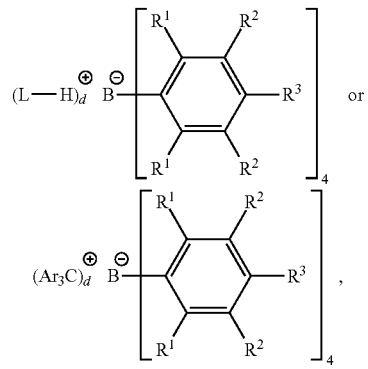

wherein:
each R$^1$ is, independently, a halide, such as a fluoride,
Ar is a substituted or unsubstituted aryl group (such as a substituted or unsubstituted phenyl), such as substituted with $C_1$ to $C_{40}$ hydrocarbyls, such as $C_1$ to $C_{20}$ alkyls or aromatics,
each R$^2$ is, independently, a halide, a $C_6$ to $C_{20}$ substituted aromatic hydrocarbyl group or a siloxy group of the formula —O—Si—R$^a$, where R$^a$ is a $C_1$ to $C_{20}$ hydrocarbyl or hydrocarbylsilyl group (such as R$^2$ is a fluoride or a perfluorinated phenyl group),
each R$^3$ is a halide, $C_6$ to $C_{20}$ substituted aromatic hydrocarbyl group or a siloxy group of the formula —O—Si—R$^a$, where R$^a$ is a $C_1$ to $C_{20}$ hydrocarbyl or hydrocarbylsilyl group (such as R3 is a fluoride or a $C_6$ perfluorinated aromatic hydrocarbyl group); wherein R$^2$ and R$^3$ can form one or more saturated or unsaturated, substituted or unsubstituted rings (such as R$^2$ and R$^3$ form a perfluorinated phenyl ring), and
L is a neutral Lewis base; (L-H)$^+$ is a Brønsted acid; d is 1, 2, or 3,
wherein the anion has a molecular weight of greater than 1020 g/mol, and
wherein at least three of the substituents on the B atom each have a molecular volume of greater than 250 cubic Å, alternately greater than 300 cubic Å, or alternately greater than 500 cubic Å.

(Ar$_3$C)$_d^+$ can be (Ph$_3$C)$_d^+$, where Ph is a substituted or unsubstituted phenyl, substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3 $V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of particularly useful Bulky activators as described in U.S. Pat. No. 8,658,556, which is incorporated by reference herein.

In some embodiments, one or more of the NCA activators is chosen from the activators described in U.S. Pat. No. 6,211,105.

Activators can include N,N-dimethylanilinium tetrakis (perfluoronaphthyl)borate, N,N-dimethylanilinium tetrakis (perfluorophenyl)borate, triphenylcarbenium tetrakis(perfluorophenyl)borate, [Ph$_3$C$^+$][B(C$_6$F$_5$)$_4$$^-$], [Me$_3$NH$^+$][B (C$_6$F$_5$)$_4$$^-$], 1-(4-(tris(pentafluorophenyl)borate)-2,3,5,6-tetrafluorophenyl)pyrrolidinium, 4-(tris(pentafluorophenyl) borate)-2,3,5,6-tetrafluoropyridine.

In at least one embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate.

In some embodiments, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4, 6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, iso-butyl, or t-butyl).

The ionic activator $Z_d^+$ ($A^{d-}$) can be one or more of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl) phenyl)borate, triphenylcarbenium tetrakis(perfluoronaphthyl)borate, triphenylcarbenium tetrakis(perfluorobiphenyl) borate, triphenylcarbenium tetrakis(3,5-bis(trifluoromethyl) phenyl)borate, triphenylcarbenium tetra(perfluorophenyl) borate, trimethylammonium tetrakis(perfluoronaphthyl) borate, triethylammonium tetrakis(perfluoronaphthyl) borate, tripropylammonium tetrakis(perfluoronaphthyl) borate, tri(n-butyl)ammonium tetrakis(perfluoronaphthyl) borate, tri(t-butyl)ammonium tetrakis(perfluoronaphthyl) borate, N,N-diethylanilinium tetrakis(perfluoronaphthyl)borate, N,N-dimethyl-(2,4,6-trimethylanilinium) tetrakis (perfluoronaphthyl)borate, and tropillium tetrakis (perfluoronaphthyl)borate.

The typical activator-to-catalyst ratio, e.g., all NCA activators-to-catalyst ratio is about a 1:1 molar ratio. Alternate ranges can include from about 0.1:1 to about 100:1, alternately from about 0.5:1 to about 200:1, alternately from about 1:1 to about 500:1, alternately from about 1:1 to about 1000:1. A particularly useful range is from about 0.5:1 to about 10:1, such as about 1:1 to about 5:1.

It is also within the scope of the present disclosure that the catalyst compounds can be combined with combinations of alumoxanes and NCA's (see for example, U.S. Pat. Nos. 5,153,157, and 5,453,410, EP 0 573 120 Bi, PCT Publication Nos. WO 94/07928, and WO 95/14044 which discuss the use of an alumoxane in combination with an ionizing activator).

Optional Scavengers or Co-Activators

In addition to these activator compounds, one or more scavengers or co-activators may be used in the catalyst system. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc. Those scavengers having bulky or $C_6$ to $C_{20}$ linear hydrocarbyl substituents connected to the metal or metalloid center usually minimize adverse interaction with the active catalyst. Examples include triethylaluminum and bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavengers may be unnecessary. Alumoxanes also may be added in scavenging quantities with other activators, e.g., methylalumoxane, [Me$_2$HNPh]$^+$[B(pfp)$_4$]$^-$ or B(pfp)$_3$ (perfluorophenyl=pfp=C$_6$F$_5$). In some embodiments, the scavengers are present at less than about 14 wt %, or from about 0.1 to about 10 wt %, or from about 0.5 to about 7 wt %, by weight of the catalyst system.

Suitable aluminum alkyl or organoaluminum compounds which may be utilized as co-activators include, for example, trimethylaluminum, triethylaluminum, tri-iso-butylaluminum, tri-n-hexylaluminum, or tri-n-octylaluminum. In some embodiments, the co-activators are present at less than about 14 wt %, or from about 0.1 to about 10 wt %, or from about 0.5 to about 7 wt %, by weight of the catalyst system. Alternately, the complex-to-co-activator molar ratio is from about 1:100 to about 100:1; about 1:75 to about 75:1; about 1:50 to about 50:1; about 1:25 to about 25:1; about 1:15 to about 15:1; about 1:10 to about 10:1; about 1:5 to about 5:1; about 1:2 to about 2:1; about 1:100 to about 1:1; about 1:75 to about 1:1; about 1:50 to about 1:1; about 1:25 to about 1:1; about 1:15 to about 1:1; about 1:10 to about 1:1; about 1:5 to about 1:1; about 1:2 to about 1:1; about 1:10 to about 2:1.

Support Materials

In some embodiments, the catalyst system may comprise an inert support material (with or without activator). The supported material can be a porous support material, for example, talc, and inorganic oxides. Other support materials include zeolites, clays, organoclays, or any other organic or inorganic support material, or mixtures thereof.

The support material can be an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, or zirconia. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, and clays. Also, combinations of these support materials may be used, for example, silica-chromium, silica-alumina, and silica-titania. Support materials can include $Al_2O_3$, $ZrO_2$, $SiO_2$, and combinations thereof, such as $SiO_2$, $Al_2O_3$, or $SiO_2/Al_2O_3$.

The support material, such as an inorganic oxide, can have a surface area in the range of from about 10 to about 700 $m^2/g$, pore volume in the range of from about 0.1 to about 4.0 cc/g and average particle size in the range of from about 5 to about 500 μm. The surface area of the support material can be in the range of from about 50 to about 500 $m^2/g$, pore volume of from about 0.5 to about 3.5 cc/g and average particle size of from about 10 to about 200 μm. The surface area of the support material can be in the range from about 100 to about 400 $m^2/g$, pore volume from about 0.8 to about 3.0 cc/g and average particle size is from about 5 to about 100 μm. The average pore size of the support material useful in the present disclosure is in the range of from about 10 to about 1000 Å, such as about 50 to about 500 Å, and such as about 75 to about 350 Å. In some embodiments, the support material is a high surface area, amorphous silica (surface area=about 300 $m^2/gm$; pore volume of about 1.65 $cm^3/gm$). Silicas can be those marketed under the trade names of DAVISON 952 or DAVISON 955 by the Davison Chemical Division of W.R. Grace and Company. In other embodiments DAVISON 948 is used.

The support material should be dry, that is, free of absorbed water. Drying of the support material can be effected by heating or calcining at about 100° C. to about 1000° C., such as at least about 600° C. When the support material is silica, it is heated to at least about 200° C., such as about 200° C. to about 850° C., such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this disclosure. The calcined support material is then contacted with at least one polymerization catalyst system having at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In an alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., such as about 23° C. to about 60° C., such as at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

The catalyst precursor, activator, coactivator, if needed, suitable solvent, and support may be added in any order or simultaneously. Typically, the complex and activator may be combined in solvent to form a solution. Then the support is added, and the mixture is stirred for about 1 minute to about 10 hours. The total solution volume may be greater than the pore volume of the support, but some embodiments limit the total solution volume below that needed to form a gel or slurry (about 90% to about 400%, such as about 100% to about 200% of the pore volume). After stirring, the residual solvent is removed under vacuum, typically at about ambient temperature and over about 10 to about 16 hours. But greater or lesser times and temperatures are possible.

The complex may also be supported absent the activator; in that case, the activator (and co-activator if needed) is added to a polymerization process's liquid phase. Additionally, two or more different complexes may be placed on the same support. Likewise, two or more activators or an activator and co-activator may be placed on the same support.

Suitable solid particle supports are typically comprised of polymeric or refractory oxide materials, each can be porous. A support material that has an average particle size greater than about 10 μm is suitable. Some embodiments include a porous support material, such as for example, talc, inorganic oxides, inorganic chlorides, for example, magnesium chloride and resinous support materials such as polystyrene polyolefin or polymeric compounds or any other organic support material. Some embodiments include inorganic oxide materials as the support material including Group 2, 3, 4, 5, 13, or 14 metal or metalloid oxides. Some embodiments include the catalyst support materials to include silica, alumina, silica-alumina, and their mixtures. Other inorganic oxides may serve either alone or in combination with the silica, alumina, or silica-alumina. These are magnesia, titania, or zirconia. Lewis acidic materials such as montmorillonite and similar clays may also serve as a support. In this case, the support can, optionally, double as the activator component, however, an additional activator may also be used.

The support material may be pretreated by any number of methods. For example, inorganic oxides may be calcined, chemically treated with dehydroxylating agents, such as aluminum alkyls, or both.

As stated above, polymeric carriers will also be suitable in accordance with the present disclosure, see for example the descriptions in PCT Publication No. WO 95/15815 and U.S. Pat. No. 5,427,991. The methods disclosed may be used with the catalyst complexes, activators or catalyst systems of the present disclosure to adsorb or absorb them on the polymeric supports, particularly if made up of porous particles, or may be chemically bound through functional groups bound to or in the polymer chains.

Useful supports typically have a surface area of from about 10 to about 700 m²/g, a pore volume of about 0.1 to about 4.0 cc/g and an average particle size of about 10 to about 500 μm. Some embodiments include a surface area of about 50 to about 500 m²/g, a pore volume of 0.5-3.5 cc/g, or an average particle size of 10-200 μm. Some embodiments include a surface area of about 100 to about 400 m²/g, a pore volume of about 0.8 to about 3.0 cc/g, and an average particle size of about 50 to about 100 μm. Useful supports typically have a pore size of about 10 to about 1000 Å, alternately about 50 to about 500 Å, or about 75 to about 350 Å.

The catalyst complexes described herein are generally deposited on the support at a loading level of about 10 to about 100 micromoles of complex per gram of solid support; alternately about 20 to about 80 micromoles of complex per gram of solid support; or about 40 to about 60 micromoles of complex per gram of support. But greater or lesser values may be used provided that the total amount of solid complex does not exceed the support's pore volume.

The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is a fluoride, chloride, bromide, phosphate, triflate, bisulfate, sulfate, or any combination thereof.

Solution Polymerization

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng, Chem. Res. 29, 2000, 4627. Generally solution polymerization involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes typically operate at temperatures from about 0° C. to about 250° C., such as from about 10° C. to about 150° C. and at pressures of about 0.1 MPa or more, such as about 2 MPa or more. The upper pressure limit is typically about 200 MPa or less, such as, about 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can also be introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

Scavengers

In some embodiments, when using the complexes described herein, particularly when they are immobilized on a support, the catalyst system will additionally comprise one or more scavenging compounds ("scavengers"). Here, the term scavenger means a compound that removes polar impurities from the reaction environment. These impurities adversely affect catalyst activity and stability. Typically, the scavenger will be an organometallic compound such as the Group 13 organometallic compounds of U.S. Pat. Nos. 5,153,157, and 5,241,025; PCT Publication Nos. WO-A-91/09882, WO-A-94/03506, WO-A-93/14132; and that of WO 95/07941. Exemplary compounds include triethyl aluminum, triethyl borane, tri-iso-butyl aluminum, methyl alumoxane, modified methylalumoxanes, bis(diisobutylaluminum)oxide, iso-butyl alumoxane, and tri-n-octyl aluminum. Those scavengers having bulky or $C_6$-$C_{20}$ linear hydrocarbyl substituents connected to the metal or metalloid center usually minimize adverse interaction with the active catalyst. Examples include triethylaluminum and bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavengers may be unnecessary. Alumoxanes (methylalumoxane), aluminum oxides (e.g., bis(diisobutylaluminum)oxide), and modified alumoxanes (e.g., MMAO-3A) also may be added in scavenging quantities with other activators such as $[Me_2HNPh]^+[B(pfp)_4]^-$ or $B(pfp)_3$ (perfluorophenyl=pfp=$C_6F_5$).

Compositions

The disclosure further relates to a composition that includes first and second polyethylenes.

In some embodiments, the composition includes any first polyethylene described herein and any second polyethylene described herein.

In some embodiments, the composition includes:
1) from about 97.5 wt % to about 99.99 wt % (such as from about 97.5 wt % to about 99.9 wt %, such as from about 99 wt % to about 99.9 wt %, such as about 99.5 wt % to about 99.8 wt %, such as from about 99.6 wt % to about 99.75 wt %), based upon the weight of the composition, of a first polyethylene having:
  a) a branching index, g'vis, (determined according the procedure described in the Test Methods section below) of about 0.97 or more, such as about 0.98 or more, such as about 0.99 or more; and/or
  b) a density of about 0.860 to about 0.980 g/cm³ (such as from about 0.880 to about 0.940 g/cm³, such as from about 0.900 to about 0.935 g/cm³, such as from about 0.910 to about 0.930 g/cm³); and/or
  c) an Mw of about 20,000 g/mol or more, such as about 20,000 g/mol to about 1,000,000 g/mol, such as about 30,000 g/mol to about 500,000 g/mol, such as about 40,000 to about 400,000 g/mol, such as about 50,000 g/mol to about 300,000 g/mol, as measured by size exclusion chromatography according to the procedure described in the Test Methods section below; and/or
  d) an Mw/Mn of about 1 to about 40, such as about 1.5 to about 20, such as about 1.8 to about 10, such as about 1.8 to about 6, as measured by size exclusion chromatography as described in the Test Methods section below;
2) from about 0.01 wt % to about 2.5 wt % (such as from about 0.1 to about 2.5 wt %, such as from about 0.1 wt % to about 1 wt %, such as from about 0.2 wt % to about 0.5 wt %, such as from about 0.25 wt % to about 0.4 wt %°/), based upon the weight of the composition, of a second polyethylene, for example comprising a polymer of ethylene, a $C_3$ to $C_{20}$ alpha-olefin, said second polyethylene having:

a) a g'vis of about 0.97 or more (such as about 0.98 or more, such as about 0.99 or more); and/or b) a molecular weight distribution (Mw/Mn) of from about 1.0 or more (such as about 2.0 or more, such as about 3.0 or more, such as about 4.0 or more, such as about 5.0 or more, such as about 6.0 or more, such as about 7.0 or more, such as about 8.0 or more, such as from about 3.0 to about 40); and/or c) an Mw of about 500,000 g/mol or more (such as about 1,000,000 g/mol or more);

In some embodiments, the difference in density of the second polyethylene and the first polyethylene is 0.04 g/cm³ or less, such as 0.02 g/cm³ or less. In some embodiments, the difference in density of the second polyethylene and the first polyethylene is 0.03 g/cm³ or more, such as 0.05 g/cm³ or more, such as 0.08 g/cm³ or more, such as 0.10 g/cm³ or more, such as 0.20 g/cm³ or more.

In at least one embodiment, the compositions (e.g., blends, films) comprising one or more first polyethylenes and one or more second polyethylene show characteristics of strain hardening in extensional viscosity. Strain hardening is observed as a sudden, abrupt upswing of the extensional viscosity in the transient extensional viscosity vs. time plot. This abrupt upswing, away from the behavior of a linear viscoelastic material, was reported in the 1960s for LDPE (reference: J. Meissner, *Rheology Acta.*, Vol. 8, p. 78, 1969) and is due to the presence of long branches in the polymer. In some embodiments, the compositions have strain-hardening in extensional viscosity. The strain-hardening ratio (SHR) is about 1.0 or more, alternately about 1.1 or more for the compositions, alternately about 1.5 or more when the extensional viscosity is measured at a strain rate of 1 second at a temperature of 150° C.

In some embodiments, the SHR of the blend is at least about 1% higher than the SHR of the first polyethylene used in the blend, alternately about 20% higher, alternately about 30% higher, alternately about 50% higher, alternately about 100% higher.

Shear rheology of the disclosed composition can be different from the rheology of the first polyethylene component, depending on the properties of the second polyethylene.

In some embodiments, the shear thinning index at 190° C. of the composition is at least about 10% higher than the shear thinning ratio of the first polyethylene component. In some embodiments, the STI is between about 1.0 and 11.0, such as between about 4.0 and 11.0, such as between about 4.0 and 7.0.

In some embodiments, crystallization temperature, Tc, (as determined by DSC as described in the Test Methods section below) of the second polyethylene is lower than the Tc of the first polyethylene. For example, the Tc of the composition is lower than the Tc of the first polyethylene component by at least about 1° C.

In some embodiments, Tc of the second polyethylene is higher than the Tc of the first polyethylene. For example, the Tc of the composition is higher than the Tc of the first polyethylene component by at least about 1° C.

Additives

The compositions may also contain other additives. Those additives include antioxidants, nucleating agents, acid scavengers, stabilizers, anticorrosion agents, plasticizers, blowing agents, cavitating agents, surfactants, adjuvants, block, antiblock, UV absorbers such as chain-breaking antioxidants, quenchers, antistatic agents, slip agents, processing aids, UV stabilizers, neutralizers, lubricants, waxes, color masterbatches, pigments, dyes and fillers and cure agents such as peroxide. In at least one embodiment, the additives may each individually present at about 0.01 wt % to about 50 wt %, such as from about 0.01 wt % to about 10 wt %, such as from about 0.1 wt % to about 6 wt %, based upon the weight of the composition.

In at least one embodiment, dyes and other colorants common in the industry may be present from about 0.01 wt % to about 10 wt %, such as from about 0.1 wt % to about 6 wt %, based upon the weight of the composition. Exemplary fillers, cavitating agents and/or nucleating agents include titanium dioxide, calcium carbonate, barium sulfate, silica, silicon dioxide, carbon black, sand, glass beads, mineral aggregates, talc, and clay.

In some embodiments, antioxidants and stabilizers such as organic phosphites, hindered amines, and phenolic antioxidants may be present in the compositions described herein from about 0.001 wt % to about 2 wt %, based upon the weight of the composition, such as from about 0.01 wt % to about 0.8 wt %, such as from about 0.02 wt % to about 0.5 wt %. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly [2-N,N'-di(2,2,6,6-tetramethyl-4-piperidinyl)-hexanediamine-4-(1-amino-1,1,3,3-tetramethylbutane)sym-triazine](CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

In some embodiments, fillers may be present from about 0.001 wt % to about 50 wt % (based on the weight of the composition), such as from about 0.01 wt % to about 25 wt %, such as from about 0.2 wt % to about 10 wt %. Desirable fillers include titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art, and may have the second polyethylene of the pre-contacted, or pre-absorbed into the filler prior to addition to the first polyethylene in some embodiments.

Metal salts of fatty acids may also be present in the polyethylene compositions. In some embodiments, such salts may be present from about 0.001 wt % to about 1 wt % of the composition, such as from about 0.01 wt % to about 0.8 wt %. Examples of fatty acids include lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, or any monocarboxylic aliphatic saturated or unsaturated acid having a chain length of 7 to 22 carbon atoms. Suitable metals include Li, Na, Mg, Ca, Sr, Ba, Zn, Cd, Al, Sn, Pb, and so forth. For example, metal salts of fatty acids are magnesium stearate, calcium stearate, sodium stearate, zinc stearate, calcium oleate, zinc oleate, and magnesium oleate.

In at least one embodiment, slip additives may be present in the compositions. For example, the slip additives are present at about 0.001 wt % to about 1 wt % (about 10 ppm to about 10,000 ppm), such as about 0.01 wt % to about 0.5 wt % (about 100 ppm to about 5000 ppm), such as about 0.1 wt % to about 0.3 wt % (about 1000 ppm to about 3000 ppm), based upon the weight of the composition. Desirable slip additives include saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-erucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; and mixtures thereof. Slip additives can be unsaturated fatty acid amides, which are commercially available from Crompton (Kekamide™ grades), Croda Universal (Crodamide™ grades), and Akzo Nobel Amides Co. Ltd. (ARMOSLIP™ grades).

Particularly, slip agents can include unsaturated fatty acid amides having the chemical structure:

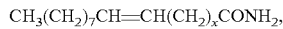

where x is 5 to 15. Some versions include: 1) Erucamide, where x is 11, also referred to as cis-13-docosenoamide (commercially available as ARMOSLIP E); 2) Oleylamide, where x is 8; and 3) Oleamide, where x is 7, also referred to as N-9-octadecenyl-hexadecanamide. In some embodiments, stearamide is also useful. Other slip additives can include those described in PCT Publication No. WO 2004/005601A1.

In some embodiments, the polyethylene compositions produced may be blended with one or more other polymers, including thermoplastic polymer(s) and/or elastomer(s).

By "thermoplastic polymer(s)" is meant a polymer that can be melted by heat and then cooled without appreciable change in solid-state properties before and after heating. Thermoplastic polymers typically include polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Polyolefins can include polymers comprising one or more linear, branched or cyclic $C_2$ to $C_{40}$ olefins, such as polymers comprising ethylene copolymerized with one or more $C_3$ to $C_{40}$ olefins, such as a $C_3$ to $C_{20}$ alpha olefin, such as $C_3$ to $C_{10}$ alpha-olefins. An example is polybutene. A polyolefin can be polypropylene. Other polyolefins can include polymers comprising ethylene including ethylene copolymerized with a $C_3$ to $C_{40}$ olefin, such as a $C_3$ to $C_{20}$ alpha olefin, such as propylene, butene, hexene, and/or octene.

By "elastomers" is meant all natural and synthetic rubbers, including those defined in ASTM D1566. Examples of elastomers include ethylene propylene rubber, ethylene propylene diene monomer rubber, styrenic block copolymer rubbers (including SEBS, SI, SIS, SB, SBS, SIBS, where S=styrene, EB=random ethylene+butene, I=isoprene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In some embodiments, the blend comprising the second polyethylene may further be combined with one or more polymers polymerizable by a high-pressure free radical process, polyvinylchloride, polybutene-1, isotactic polybutene, ABS resins, block copolymer, styrenic block copolymers, polyamides, polycarbonates, PET resins, cross-linked polyethylene, copolymers of ethylene and vinyl alcohol (EVOH), polymers of aromatic monomers such as polystyrene, poly-1 esters, polyacetal, polyvinylidine fluoride, polyethylene glycols and/or polyisobutylene.

Tackifiers may be blended with the compositions described herein. Examples of useful tackifiers include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the tackifier is hydrogenated. In other embodiments the tackifier is non-polar. Non-polar means that the tackifier is substantially free of monomers having polar groups. For example, the polar groups are not present; however, if they are, preferably they are present at not more than about 5 wt %, such as not more than about 2 wt %, such as no more than about 0.5 wt %, based upon the weight of the tackifier. In some embodiments, the tackifier has a softening point (Ring and Ball, as measured by ASTM E-28) of about 80° C. to about 140° C., such as about 100° C. to about 130° C. The tackifier, if present, is typically present at about 1 wt % to about 50 wt %, based upon the weight of the blend, such as about 10 wt % to about 40 wt %, even such as about 20 wt % to about 40 wt %.

In at least one embodiment, tackifier is not present, or if present, is present at less than about 10 wt %, such as less than about 5 wt %, such as at less than about 1 wt %.

Blending and Processing

The disclosure further provides for methods of making a composition. The method includes blending one or more first polyethylenes and one or more second polyethylenes. The second polyethylene may be any second polyethylene described herein, and the first polyethylene may be any first polyethylene described herein. The composition may further include one or more additives.

In some embodiments, the method includes blending a second polyethylene with a first polyethylene, wherein the first polyethylene comprises a copolymer of ethylene and one or more $C_3$ to $C_{20}$ alpha-olefins, and has an Mw of about 20,000 g/mol to about 1,000,000 g/mol, and a density of about 0.91 g/cm³ to about 0.96 g/cm³.

The compositions and blends described herein may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well known in the art, and can include, for example: fillers; antioxidants (e.g. hindered phenolics such as IRGANOX™ 1010 or IRGANOX™ 1076 available from Ciba-Geigy); phosphites (e.g. IRGAFOS™ 168 available from Ciba-Geigy); anti-cling additives; tackifiers, such as polybutenes, terpene resins, aliphatic and aromatic hydrocarbon resins, alkali metal and glycerol stearates and hydrogenated rosins; UV stabilizers; heat stabilizers; antiblocking agents; release agents; anti-static agents; pigments; colorants; dyes; waxes; silica; fillers; and talc.

The polymers suitable for use in the embodiments described herein can be in any physical form when used to blend with the second polyethylene. In some embodiments, reactor granules, defined as the granules of polymer that are isolated from the polymerization reactor prior to any processing procedures, are used to blend with the second polyethylene. The reactor granules typically have an average diameter of from about 50 μm to about 10 mm in in some embodiments, and from about 10 μm to about 5 mm in other embodiments. In some embodiments, the polymer is in the form of pellets, such as, for example, having an average diameter of from about 1 mm to about 10 mm that are formed from melt extrusion of the reactor granules.

The components can be blended by any suitable means, and are typically blended to yield an intimately mixed composition which may be a homogeneous, single phase mixture. For example, they may be blended in a static mixer, batch mixer, extruder, or a combination thereof, that is sufficient to achieve an adequate dispersion of second polyethylene in the polymer.

The mixing step may involve first dry blending using, for example, a tumble blender, where the first and second polyethylene are brought into contact first, without intimate mixing, which may then be followed by melt blending in an extruder. Another method of blending the components is to melt blend the first polyethylene pellets with the second polyethylene directly in an extruder or batch mixer. It may also involve a "master batch" approach, where the final second polyethylene concentration is achieved by combining neat first polyethylene with an appropriate amount of second polyethylene that had been previously prepared at a higher second polyethylene concentration. The mixing step may take place as part of a processing method used to fabricate articles, such as in the extruder on an injection molding machine or blown-film line or fiber line.

In at least one embodiment, the first polyethylene and second polyethylene are "melt blended" in an apparatus such as an extruder (single or twin screw) or batch mixer. The first polyethylene may also be "dry blended" with the second polyethylene using a tumbler, double-cone blender, ribbon blender, or other suitable blender. In some embodiments, the first polyethylene and second polyethylene are blended by a combination of approaches, for example a tumbler followed by an extruder. A preferred method of blending is to include the final stage of blending as part of an article fabrication step, such as in the extruder used to melt and convey the composition for a molding step like injection molding or blow molding. This could include direct injection of the second polyethylene into the extruder, either before or after the first polyethylene is fully melted. Extrusion technology for is described in more detail in, for example, PLASTICS EXTRUSION TECHNOLOGY p. 26-37 (Friedhelm Hensen, ed. Hanser Publishers 1988).

In some embodiments, the composition may be blended in solution by any suitable means, by using a solvent that dissolves both components to a significant extent. The blending may occur at any temperature or pressure where the first and second polyethylenes remain in solution. Conditions include blending at high temperatures, such as about 10° C. or more, such as about 20° C. or more over the melting point of the first polyethylene. Such solution blending would be particularly useful in processes where the first polyethylene is made by solution process and the second polyethylene is added directly to the finishing train, rather than added to the dry first polyethylene in another blending step altogether. Such solution blending would also be particularly useful in processes where the ethylene polymer is made in a bulk or high pressure process where both the first polyethylene and the second polyethylene were soluble in the monomer. As with the solution process, the second polyethylene is added directly to the finishing train rather than added to the dry first polyethylene in another blending step altogether.

Thus, in the cases of fabrication of articles using methods that involve an extruder, such as injection molding or blow molding, any means of combining the first polyethylene and second polyethylene to achieve the desired composition serve equally well as fully formulated pre-blended pellets, since the forming process includes a re-melting and mixing of the raw material; example combinations include simple blends of neat polymer pellets and second polyethylene, neat polymer granules and second polyethylene, neat polymer pellets and pre-blended pellets, and neat polymer granules and pre-blended pellets. Here, "pre-blended pellets" means pellets of a composition comprising the first polyethylene and second polyethylene at some concentration. In the process of compression molding, however, little mixing of the melt components occurs, and pre-blended pellets would be preferred over simple blends of the constituent pellets (or granules) and second polyethylene. Those skilled in the art will be able to determine the appropriate procedure for blending the components to balance the need for intimate mixing of the component ingredients with the desire for process economy.

Applications

The enhanced properties of the polyethylene compositions described herein are useful in a wide variety of applications, including transparent articles such as cook and storage ware, and in other articles such as furniture, automotive components, toys, sportswear, medical devices, sterilizable medical devices and sterilization containers, nonwoven fibers and fabrics and articles therefrom such as drapes, gowns, filters, hygiene products, diapers, and films, oriented films, sheets, tubes, pipes and other items where softness, high impact strength, and impact strength below freezing is important.

Additional examples of desirable articles of manufacture made from compositions disclosed herein include films, sheets, fibers, woven and nonwoven fabrics, automotive components, furniture, sporting equipment, food storage containers, transparent and semi-transparent articles, toys, tubing and pipes, sheets, packaging, bags, sacks, coatings, caps, closures, crates, pallets, cups, non-food containers, pails, insulation, and medical devices. Further examples include automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g. garden furniture), playground equipment, boat and water craft components, and other such articles. In particular, the compositions are suitable for automotive components such as bumpers, grills, trim parts, dashboards, instrument panels, exterior door and hood components, spoiler, wind screen, hub caps, mirror housing, body panel, protective side molding, and other interior and external components associated with automobiles, trucks, boats, and other vehicles.

Other useful articles and goods that may be manufactured by the practice of the present disclosure include: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

Fabrication of these articles may be accomplished by injection molding, extrusion, thermoforming, blow molding, rotational molding (rotomolding), fiber spinning, spin bonding or melt blown bonding such as for non-woven fabrics, film blowing, stretching for oriented films, casting such as for films (including use of chill rolls), profile deformation, coating (film, wire, and cable), compression molding, calendering, foaming, laminating, transfer molding, cast molding, pultrusion, protrusion, draw reduction, and other common processing methods, or combinations thereof, such as is known in the art and described in, for example, PLASTICS PROCESSING (Radian Corporation, Noyes Data Corp. 1986). Use of at least thermoforming or film applications allows for the possibility of and derivation of benefits from uniaxial or biaxial orientation. Sufficient mixing should take place to assure that an intimately mixed, preferably uniform blend will be produced prior to conversion into a finished product.

Adhesives

The polymers described herein or blends thereof can be used as adhesives, either alone or combined with tackifiers. Some tackifiers are described above. The tackifier is typically present at about 1 wt % to about 50 wt %, based upon the weight of the blend, such as about 10 wt % to about 40 wt %, such as about 20 wt % to about 40 wt %. Other additives, as described above, may also be added.

The adhesives can be used in any adhesive application including disposables, packaging, laminates, pressure sensitive adhesives, tapes labels, wood binding, paper binding, non-wovens, road marking, and reflective coatings. In at least one embodiment, the adhesives can be used for disposable diaper and napkin chassis construction, elastic attachment in disposable goods converting, packaging, labeling, bookbinding, woodworking, and other assembly applications. Particularly, some applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Films

The compositions described above and the blends thereof may be formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in a uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented.

Likewise, oriented polypropylene could be laminated to oriented polyethylene, or oriented polyethylene could be coated onto polypropylene then optionally the combination could be oriented even further. Typically the films are oriented in the Machine Direction (MD) at a ratio of up to about 15, such as between about 5 and about 7, and in the Transverse Direction (TD) at a ratio of up to about 15, such as about 7 to about 9. However, in some embodiments, the film is oriented to the same extent in both the MD and TD directions.

In some embodiments, the compositions described above are formed into a film, wherein the film has:

1) an MD tear (Elmendorf tear) between about 50 g/mil to about 250 g/mil (such as about 50 g/mil to about 225 g/mil, such as about 150 g/mil to about 225 g/mil), or alternately between about 50 g to about 250 g (such as about 50 g to about 225 g, such as about 150 g to about 225 g); and/or 2) a TD tear (Elmendorf tear) between about 400 g/mil to about 800 g/mil (such as between about 500 g/mil to about 800 g/mil, such as between about 500 g/mil to about 600 g/mil), or alternately between about 400 g to about 800 g (such as between about 500 g to about 800 g, such as between about 500 g to about 600 g); and/or 3) a dart drop impact strength (Phenolic A) between about 100 g/mil and about 550 g/mil (such as between about 400 g/mil and about 550 g/mil), or alternately between about 100 g and about 550 g (such as between about 400 g and about 550 g); and/or 4) a shear thinning index at 190° C. between about 1 and about 11 (such as between about 4.0 and about 11, such as between about 4 and about 7); and/or 5) a strain hardening ratio (SHR) at 150° C., 0.1 $s^{-1}$ between about 1 and 2.5 (such as between about 1.5 and 2.5, such as between about 1.5 and 2.0); and/or 6) a gauge mic average (average film thickness) of between about 0.9 mils and about 1.5 mils (such as between about 0.95 mils and about 1.1 mils); and/or 7) a 1% secant modulus (MD) of between about 25,000 psi and about 35,000 psi (such as between about 26,000 psi and about 30,000 psi, such as between about 26,000 psi and about 29,000 psi); and/or 8) a 1% secant modulus (TD) of between about 25,000 psi about 40,000 psi (such as between about 27,000 psi and about 38,000 psi, such as between about 27,000 psi and about 35,000 psi); and/or
9) a tensile yield strength (MD) of between about 1,300 psi and about 1,700 psi (such as between about 1,300 psi and about 1,500 psi, such as between about 1,300 psi and about 1,450 psi); and/or
10) a tensile yield strength (TD) of about 1,300 psi and about 1,700 psi (such as between about 1,300 psi and about 1,650 psi, such as between about 1,500 psi and about 1,650 psi); and/or
11) a percent elongation at yield (MD) of between about 5.5% and about 8.5% (such as between about 6% and about 7%, such as between about 6% and about 6.5%); and/or
12) a percent elongation at yield (TD) of between about 5% and about 9% (such as between about 5.5% and about 8%, such as between about 6% and about 8%); and/or
13) a tensile strength (MD) between about 6,500 psi and about 11,000 psi (such as between about 7,000 psi and about 11,000 psi, such as between about 9,000 psi and about 11,000 psi); and/or
14) a tensile strength (TD) between about 6,000 psi and about 9,000 psi (such as between about 6,500 psi and about 8,500 psi, such as between about 6,500 psi and about 8,000 psi); and/or
15) a percent elongation at break (MD) between about 250% and about 550% (such as between about 300% and about 500%, such as between about 400% and about 500%); and/or
16) a percent elongation at break (TD) between about 500% and about 800% (such as between about 500% and about 700%, such as between about 550% and about 650%); and/or
17) a crystallization temperature, Tc, between about 95° C. and about 115° C. (such as between about 100° C. and about 110° C., such as between about 100° C. and about 105° C.); and/or
18) a peak melting point, Tm, between about 100° C. and about 125° C. (such as between about 110° C. and about 120° C., such as between about 110° C. and about 115° C.); and/or
19) a percent crystallinity between about 25% and about 50% (such as between about 30% and about 45%, such as between about 35% and about 40%); and/or
20) a wide-angle x-ray scattering (WAXS) Hermans Orientation function (–fb), absolute value, between about 0.16 and about 0.25 (such as between about 0.18 and about 0.25, such as between about 0.18 and about 0.22); and/or
21) a single angle x-ray scattering (SAXS) Hermans orientation of between about 0.1 to about 0.35 (such as between about 0.15 to about 0.3, such as between about 0.15 to about 0.21); and/or
22) a wide-angle x-ray scattering (WAXS) Hermans Orientation (fa) of between about 0.15 to about 0.30 (such as between about 0.2 to about 0.28, such as between about 0.22 to about 0.26).

In multilayer constructions, the other layer(s) may be any layer typically included in multilayer film structures. For example the other layer or layers may be:

1) Polyolefins. Polyolefins include homopolymers or copolymers of $C_2$ to $C_{40}$ olefins, such as $C_2$ to $C_{20}$ olefins, such as a copolymer of an alpha-olefin and another olefin or alpha-olefin (ethylene is defined to be an alpha-olefin for purposes of this disclosure). For example, homopolyethylene, homopolypropylene, propylene copolymerized with ethylene and or butene, ethylene copolymerized with one or more of propylene, butene or hexene, and optional dienes. Examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as, for example, thermoplastic elastomers and rubber toughened plastics.
2) Polar polymers. Polar polymers include homopolymers and copolymers of esters, amides, acetates, anhydrides, copolymers of a $C_2$ to $C_{20}$ olefin, such as ethylene and/or propylene and/or butene with one or more polar monomers such as acetates, anhydrides, esters, alcohol, and or acrylics. Examples include polyesters, polyamides, ethylene vinyl acetate copolymers, and polyvinyl chloride.
3) Cationic polymers. Cationic polymers include polymers or copolymers of geminally disubstituted olefins, alpha-heteroatom olefins and/or styrenic monomers. Geminally disubstituted olefins include isobutylene, isopentene, isoheptene, isohexane, isooctene, isodecene, and isododecene. Alpha-heteroatom olefins include vinyl ether and vinyl carbazole, styrenic monomers include styrene, alkyl styrene, para-alkyl styrene, alpha-methyl styrene, chloro-styrene, and bromo-para-methyl styrene. Examples of cationic polymers include butyl rubber, isobutylene copolymerized with para methyl styrene, polystyrene, and poly-alpha-methyl styrene.
4) Miscellaneous. Other layers can include paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, and pigments.

The films may vary in thickness depending on the intended application; however, films of a thickness from about 1 μm to about 250 μm are usually suitable, such as at least about 75 μm thick. Films intended for packaging are usually from about 10 to about 60 μm thick. The thickness of the sealing layer is typically about 0.2 μm to about 50 μm. There may be a sealing layer on both the inner and outer surfaces of the film or the sealing layer may be present on only the inner or the outer surface. Films intended for heavier use, such as geomembranes), can be from about 25 μm to about 260 μm thick, such as from about 25 μm to about 130 μm thick, such as from about 50 μm to about 110 μm thick.

Additives such as block, antiblock, antioxidants, pigments, fillers, processing aids, UV stabilizers, neutralizers, lubricants, surfactants and/or nucleating agents may also be present in one or more than one layer in the films. Additives include silicon dioxide, titanium dioxide, polydimethylsiloxane, talc, dyes, wax, calcium sterate, carbon black, low molecular weight resins and glass beads, and these additives can be present at from about 0.1 ppm to about 1000 ppm.

In some embodiments, one more layers may be modified by corona treatment, electron beam irradiation, gamma irradiation, or microwave irradiation. In at least one embodiment, one or both of the surface layers is modified by corona treatment.

The films described herein may also comprise from about 5 wt % to about 60 wt %, based upon the weight of the polymer and the resin, of a hydrocarbon resin. The resin may be combined with the polymer of the seal layer(s) or may be combined with the polymer in the core layer(s). The resin can have a softening point above 100° C., such as from about 130° C. to about 180° C. Hydrocarbon resins can include those described above. The films comprising a hydrocarbon resin may be oriented in uniaxial or biaxial directions to the same or different degrees. For more information on blends of tackifiers and modifiers useful herein, see U.S. Application No. 60/617,594, filed Oct. 8, 2004.

The films described above may be used as stretch and/or cling films. Stretch/cling films are used in various bundling, packaging and palletizing operations. To impart cling properties to, or improve the cling properties of a particular film, a number of well-known tackifying additives have been utilized. Common tackifying additives include polybutenes, terpene resins, alkali metal stearates and hydrogenated rosins and rosin esters. The cling properties of a film can also be modified by the well-known physical process referred to as corona discharge. Some polymers (such as ethylene methyl acrylate copolymers) do not need cling additives and can be used as cling layers without tackifiers. Stretch/cling films may comprise a slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Particularly, a slip layer includes a linear low density polyethylene (LLDPE). Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs, and various lubricants. These additives are utilized in amounts ranging from about 100 ppm to about 20,000 ppm, such as between about 500 ppm to about 10,000 ppm, by weight based upon the weight of the slip layer. The slip layer may, if desired, also include one or more other additives as described above.

In at least one embodiment, films prepared from the compositions described herein have improved bubble stability compared to the ethylene copolymers of the compositions alone as determined by reduced gauge variation, e.g. a gauge variation of about 10% or less, such as about 8% or less, such as about 5% or less.

In at least one embodiment, films prepared from the compositions described herein have good optical properties, such as a haze (ASTM D1003) of about 20 or less, such as about 15 or less, such as about 10 or less.

Molded and Extruded Products

The compositions described above may also be used to prepare molded products in any molding process including injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming, matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described, however, this should not be construed as limiting the thermoforming methods useful with the compositions described herein. First, an extrudate film of the composition (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool. Thermoforming is accomplished by vacuum, positive air pressure, plug-assisted vacuum forming, or combinations and variations of these, once the sheet of material reaches thermoforming temperatures, typically of from about 140° C. to about 185° C. or higher. A pre-stretched bubble step is used, especially on large parts, to improve material distribution. In some embodiments, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer, fast plug speeds generally provide the best material distribution in the part. The shaped laminate is then cooled in the mold. Sufficient cooling to maintain a mold temperature of about 30° C. to about 65° C. is desirable. The part is below about 90° C. to about 100° C. before ejection in some embodiments. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING (Jacqueline I. Kroschwitz, ed., John Wiley & Sons 1990).

In some embodiments of the formation and shaping process, profile co-extrusion can be used. The profile co-extrusion process parameters are as above for the blow molding process, except the die temperatures (dual zone top and bottom) range from about 150° C. to about 235° C., the feed blocks are from about 90° C. to about 250° C., and the water cooling tank temperatures are from about 10° C. to about 40° C.

One embodiment of an injection molding process is described as follows. The shaped laminate is placed into the injection molding tool. The mold is closed and the substrate material is injected into the mold. The substrate material has a melt temperature between about 180° C. and about 300° C., such as from about 200° C. and about 250° C., and is injected into the mold at an injection speed of between about 2 and about 10 seconds. After injection, the material is packed or held at a predetermined time and pressure to make the part dimensionally and aesthetically correct. Typical time periods are from about 5 to about 25 seconds and pressures from about 1,000 kPa to about 15,000 kPa. The mold is cooled between about 10° C. and about 70° C. to cool the substrate. The temperature will depend on the desired gloss and appearance. Typical cooling time is from about 10 to about 30 seconds, depending in part on the thickness. Finally, the mold is opened and the shaped composite article ejected.

Likewise, molded articles may be fabricated by injecting molten polymer blend into a mold that shapes and solidifies the molten polymer into desirable geometry and thickness of molded articles. A sheet may be made either by extruding a substantially flat profile from a die, onto a chill roll, or alternately by calendering. Sheet will generally be considered to have a thickness of from about 10 mils to about 100 mils (about 254 µm to about 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded article. The tubing will generally be in the range of from about 0.31 cm to about 2.54 cm in outside diameter, and have a wall thickness in the range of from about 254 µm to about 0.5 cm. The pipe will generally be in the range of from about 2.54 cm to about 254 cm in outside diameter, and have a wall thickness in the range of from about 0.5 cm to about 15 cm. Sheet made from the products of some embodiments of a version of the present disclosure may be used to form containers. Such containers may be formed by thermoforming, solid phase pressure forming, stamping and other shaping techniques. Sheets may also be formed to cover floors or walls or other surfaces.

In some embodiments of the thermoforming process, the oven temperature is between about 160° C. and about 195° C., the time in the oven between about 10 and about 20 seconds, and the die temperature, typically a male die, between 10° C. and 71° C. In some embodiments, the final thickness of the cooled (room temperature), shaped laminate is from about 10 µm to about 6000 µm, such as from about 200 µm about to 6000 µm, such as from about 250 µm to about 3000 µm, such as from about 500 µm to about 1550 µm, a desirable range being any combination of any upper thickness limit with any lower thickness limit.

In some embodiments of the injection molding process, wherein a substrate material is injection molded into a tool including the shaped laminate, the melt temperature of the substrate material is between about 190° C. and about 255° C. (such as between about 210° C. and about 250° C.), the fill time from about 2 to about 10 seconds (such as from 2 to 8 seconds), and a tool temperature of from about 25° C. to about 65° C. (such as from about 27° C. and about 60° C.). In at least one embodiment, the substrate material is at a temperature that is hot enough to melt any tie-layer material or backing layer to achieve adhesion between the layers.

In some embodiments, the compositions may be secured to a substrate material using a blow molding operation. Blow molding is particularly useful in such applications for making closed articles, such as fuel tanks and other fluid containers, playground equipment, outdoor furniture and small enclosed structures.

It will be understood by those skilled in the art that the steps outlined above may be varied, depending upon the desired result. For example, the extruded sheet of the compositions may be directly thermoformed or blow molded without cooling, thus skipping a cooling step. Other parameters may be varied as well in order to achieve a finished composite article having desirable features.

Test Methods

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

Density is measured by density-gradient column, as described in ASTM D1505, on a compression-molded specimen that has been slowly cooled to room temperature (i.e. over a period of 10 minutes or more) and allowed to age for a sufficient time that the density is constant within +/−0.001 g/cm$^3$. The units for density are g/cm$^3$.

Gauge, reported in mils, was measured using a Measuretech Series 200 instrument. The instrument measures film thickness using a capacitance gauge. For each film sample, ten film thickness data points were measured per inch of film as the film was passed through the gauge in a transverse direction. From these measurements, an average gauge measurement was determined and reported. Coefficient of variation (Gauge COV) is used to measure the variation of film thickness in the transverse direction. The Gauge COV is defined as a ratio of the standard deviation to the mean of film thickness.

Elmendorf Tear, reported in grams (g) or grams per mil (g/mil), was measured as specified by ASTM D-1922.

Tensile Strength at Yield, Tensile Strength at Break, Ultimate Tensile Strength and Tensile Strength at 50%, 100%, and/or 200% Elongation were measured as specified by ASTM D-882.

Tensile Peak Load was measured as specified by ASTM D-882.

Tensile Energy, reported in inch-pounds (in-lb), was measured as specified by ASTM D-882.

Elongation at Yield and Elongation at Break, reported as a percentage (%), were measured as specified by ASTM D-882.

1% Secant Modulus (M), reported in pounds per square inch (lb/in$^2$ or psi), was measured as specified by ASTM D-882.

Dart Drop Impact or Dart Drop Impact Strength (DIS), reported in grams (g) and/or grams per mil (g/mil), was measured as specified by ASTM D-1709, method A, unless otherwise specified.

Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting compression-molded sample of resin onto the parallel plates. To determine the samples viscoelastic behavior, frequency sweeps in the range from 0.01 to 100 rad/s were carried out at a temperature of 190° C. under constant strain. Depending on the molecular weight and temperature, a strain of 10% was used and the linearity of the response was verified. A nitrogen stream was circulated through the sample oven to minimize chain oxidation or cross-linking during the experiments. All the samples were compression molded at 190° C. and stabilizers were added. A sinusoidal shear strain is applied to the material if the strain amplitude is sufficiently small the material behaves linearly. It can be shown that the resulting steady-state stress will also oscillate sinusoidally at the same frequency but will be shifted by a phase angle $\delta$ with respect to the strain wave. The stress leads the strain by $\delta$. For purely elastic materials $\delta=0°$ (stress is in phase with strain) and for purely viscous materials, $\delta=90°$ (stress leads the strain by 900 although the stress is in phase with the strain rate). For viscoelastic materials, $0<\delta<90$. The shear thinning index (STI) was measured using plots of the logarithm (base ten) of the dynamic viscosity $\eta^*$ versus logarithm (base ten) of the angular frequency, $\omega$. STI is defined at 190° C. as the ratio of the complex viscosity at $\omega=0.01$ s$^{-1}$ by the value at $\omega=100$ s$^{-1}$, namely STI=$(\eta^*_{0.01})/(\eta^*_{100})$.

The transient uniaxial extensional viscosity was measured using a SER-2-A Testing Platform available from Xpansion Instruments LLC, Tallmadge, Ohio, USA. The SER Testing Platform was used on a Rheometrics ARES-LS (RSA3) strain-controlled rotational rheometer available from TA Instruments Inc., New Castle, Del., USA. The SER Testing Platform is described in U.S. Pat. Nos. 6,578,413 and 6,691,569, which are incorporated herein for reference. A general description of transient uniaxial extensional viscosity measurements is provided, for example, in "Strain hardening of various polyolefins in uniaxial elongational flow", The Society of Rheology, Inc., *J. Rheol.*, 47(3), p. 619-630 (2003); and "Measuring the transient extensional rheology of polyethylene melts using the SER universal testing platform", The Society of Rheology, Inc., *J. Rheol.*, 49(3), p. 585-606 (2005), incorporated herein for reference. Strain hardening occurs when a polymer is subjected to uniaxial extension and the transient extensional viscosity increases more than what is predicted from linear viscoelastic theory. Strain hardening is observed as an abrupt upswing of the extensional viscosity in the transient extensional viscosity vs. time plot. A strain hardening ratio (SHR) is used at 150° C. to characterize the upswing in extensional viscosity and is defined as the ratio of the maximum transient extensional viscosity over three times the value of the transient zero-shear-rate viscosity at the same strain (0.1 s$^{-1}$). Strain hardening is present in the material when the ratio is greater than 1.

Comonomer content (such as for butene, hexene and octene) was determined via FTIR measurements according to ASTM D3900 (calibrated versus $^{11}$C NMR). A thin homogeneous film of polymer, pressed at a temperature of about 150° C., was mounted on a Perkin Elmer Spectrum 2000 infrared spectrophotometer. The weight percent of copolymer is determined via measurement of the methyl deformation band at about 1375 cm$^{-1}$. The peak height of this band is normalized by the combination and overtone band at about 4321 cm$^{-1}$, which corrects for path length differences.

Polyethylene crystallinity is probed using X-ray scattering methods. Because polyethylene is a semi-crystalline polymer, the crystal structure can be resolved using X-ray diffraction (XRD) or Wide-Angle X-ray Scattering (WAXS). The unit cells of the crystalline polymer are the building blocks of the crystalline lamellae: planar sheets of crystalline material. Because not all polymer chains can crystallize, amorphous chains also exist and these typically are found in between stacks of crystalline lamellae. WAXS can probe the extent to which these polymer chains crystallize since the data will contain information regarding crystalline and amorphous morphology. WAXS also can determine crystalline orientation and crystallite size. All wide-angle X-ray scattering (WAXS) were performed using an in-house SAX-SLAB Ganesha 300XL+. Polymer materials were placed directly in the path of the incident X-ray beam. The incident wavelength was 0.154 nm from a CuKa microfocus sealed tube source (Xenocs). All samples were collected at sample-to-detector positions of 91 mm and were held in a vacuum to minimize air scatter. The SAXS (single angle x-ray scattering) and WAXS were recorded using a Dectris Pilatus. Sample to detector distance was calibrated using a Silver Behenate standard. A 0-360 integration was performed on the 2D scattering patterns. The Intensities were recorded as a function of scattering vector, q, where $q=(4\pi \sin \theta)/\lambda$, (q is the scattering angle and I is the incident wavelength) and the scattering vector q is also defined as q=2p/d where d is a distance in real space: unit cell dimension from WAXS, and inter-lamellae spacing from SAXS.

All data were corrected for transmission, background scattering and detector non-linearity.

The crystallinity of the film samples is obtained from WAXS: unit cell type and overall extent of crystallinity. WAXS and SAXS patterns were collapsed to an I(q) vs q plot. The overall degree of crystallinity of the film samples was determined by taking the ratio of the peak areas of the (110), (200) and (020) (which were fit to a Gaussian function) to the total area underneath the 1D WAXS profile. The amorphous region was also fit to a Gaussian curve. See Ryan, A. J., et al., *A synchrotron X-ray study of melting and recrystallization in isotactic polypropylene*. Polymer, 1997. 38(4): p. 759-768.

Peak melting point, Tm, (also referred to as melting point), peak crystallization Temperature, Tc, (also referred to as crystallization temperature), glass transition temperature (Tg), heat of fusion (AHf or Hf), and percent crystallinity were determined using the following DSC procedure according to ASTM D3418-03. Differential scanning calorimetric (DSC) data were obtained using a TA Instruments model Q200 machine. Samples weighing about 5 to about 10 mg were sealed in an aluminum hermetic sample pan. The DSC data were recorded by first gradually heating the sample to about 200° C. at a rate of about 10° C./minute. The sample was kept at about 200° C. for about 2 minutes, then cooled to about −90° C. at a rate of about 10° C./minute, followed by an isothermal for about 2 minutes and heating to about 200° C. at about 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B(Joules/gram)]*100, where B is the heat of fusion for the 100% crystalline homopolymer of the major monomer component. These values for B are to be obtained from the *Polymer Handbook*, Fourth Edition, published by John Wiley and Sons, New York 1999, provided; however, that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of the polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature, e.g., at a temperature of 23±2° C., for a period of about 2 days) or annealed to maximize the level of crystallinity.

Polymer molecular weight (weight-average molecular weight, Mw, number-average Molecular weight, Mn, and Z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS). For purposes of the claims, SEC-DRI-LS-VIS shall be used. Three Polymer Laboratories PLgel 10 mm Mixed-B columns are used. The nominal flow rate is about 0.5 cm³/min and the nominal injection volume is about 300 μL. The various transfer lines, columns and differential refractometer (the DRI detector) are contained in an oven maintained at about 135° C. Solvent for the SEC experiment is prepared by dissolving about 6 grams of butylated hydroxy toluene as an antioxidant in 4 liters of reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC.

Polymer solutions are prepared by placing dry polymer in a glass container, adding the desired amount of TCB, then heating the mixture at about 160° C. with continuous agitation for about 2 hours. All quantities are measured gravimetrically. The TCB densities used to express the polymer concentration in mass/volume units are about 1.463 g/ml at room temperature and about 1.324 g/ml at about 135° C. The injection concentration can range from about 1.0 to about 2.0 mg/ml, with lower concentrations being used for higher molecular weight samples.

Prior to running each sample the DRI detector and the injector are purged. Flow rate in the apparatus is then increased to about 0.5 ml/minute, and the DRI allowed to stabilize for about 8 to about 9 hours before injecting the first sample. The LS laser is turned on about 1 to about 1.5 hours before running samples.

The concentration, c, at each point in the chromatogram is calculated from the DRI signal after subtracting the prevailing baseline, $I_{DRI}$, using the following equation:

$$c=(K_{DRI}I_{DRI})/(dn/dc),$$

where $K_{DRI}$ is a constant determined by calibrating the DRI, and (dn/dc) is the same as described below for the LS analysis. The processes of subtracting the prevailing baseline (i.e. background signal) and setting integration limits that define the starting and ending points of the chromatogram are well known to those familiar with SEC analysis. Units on parameters throughout this description of the SEC method are such that concentration is expressed in g/cm³, molecular weight is expressed in g/mol, and intrinsic viscosity is expressed in dL/g.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and Ko is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 135° C. and k=690 nm. For analyzing polyethylene homopolymers, ethylene-hexene copolymers, and ethylene-octene copolymers, dn/dc=0.1048 ml/mg and A2=0.0015; for analyzing ethylene-butene copolymers, dn/dc=0.1048*(1−0.00126*w2) ml/mg and A2=0.0015 where w2 is weight percent butene comonomer.

A high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer at each point in the chromatogram, $(\eta_s)_i$, is calculated from the ratio of their outputs. The intrinsic viscosity at each point in the chromatogram, $[\eta]_i$, is calculated by solving the following equation (for the positive root) at each point i:

$$(\eta_s)_i = c_i[\eta]_i + 0.3(c_i[\eta]_i)^2,$$

where $c_i$ is the concentration at point i as determined from the DRI analysis.

The branching index ($g'_{vis}$) is calculated using the output of the SEC-DRI-LS-VIS method (described above) as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as $$g'_{vis} = \frac{[\eta]_{avg}}{KM_v^\alpha},$$

where the Mark-Houwink parameters k and a are given by k=0.000579 for polyethylene homopolymer and α=0.695 for all polyethylene polymers. For ethylene copolymers, k decreases with increasing comonomer content. $M_V$ is the viscosity-average molecular weight based on molecular weights determined by LS analysis.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

Proton NMR spectra were collected using a 500 MHz Varian pulsed fourier transform NMR spectrometer equipped with a variable temperature proton detection probe operating at 120° C. The polymer sample is dissolved in 1,1,2,2-tetrachloroethane-d2 (TCE-d2) and transferred into a 5 mm glass NMR tube. Typical acquisition parameters are sweep width=10 KHz, pulse width=30 degrees, acquisition time=2 s, acquisition delay=5 s and number of scans=120. Chemical shifts are determined relative to the TCE-d2 signal which is set to 5.98 ppm.

In conducting the $^{13}$C NMR investigations, samples are prepared by adding about 0.3 g sample to about 3 g of tetrachloroethane-d2 in a 10 mm NMR tube. The samples are dissolved and homogenized by heating the tube and its contents to about 150° C. The data are collected using a Varian spectrometer, with corresponding IH frequencies of either 400 or 700 MHz (in event of conflict, 700 MHz shall be used). The data are acquired using nominally about 4000 transients per data file with about a 10 second pulse repetition delay. To achieve maximum signal-to-noise for quantitative analysis, multiple data files may be added together. The spectral width was adjusted to include all the NMR resonances of interest and FIDs were collected containing a minimum of about 32K data points. The samples are analyzed at about 120° C. in a 10 mm broad band probe.

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

EXAMPLES

The present disclosure, while not meant to be limited by, may be better understood by reference to the following examples and tables.

Exceed™ Polyethylene 2018 ("Exceed PE 2018"), an m-LLDPE available from ExxonMobil Chemical Company (Houston, Tex.), has an MI of 2.0 dg/min and a density of 0.918 g/cm$^3$.

Exceed™ Polyethylene 1018 ("Exceed PE 1018"), is an m-LLDPE (metallocene ethylene/hexene copolymer) available from ExxonMobil Chemical Company (Houston, Tex.), having an MI of 1.0 dg/min and a density of 0.918 g/cm$^3$.

The second polyethylenes (e.g., linear UHMW-PE) is a high density commercial resin (GUR4120, Ticona). The second polyethylenes are blended with m-LLDPE Exceed PE 1018 as principle matrix. GUR4120 was analyzed using Tosoh columns and the molecular weight distribution from gel permeation chromatography (DRI) is shown in FIG. 1. The linear UHMW-PE has a molecular weight of Mw of about 1,500,000 g/mol and a polydispersity (Mw/Mn) of about 4.4. Other data for the linear UHMW-PE is provided in in Table 1, as well as data for the comparative example second polyethylenes (branched polyethylenes).

TABLE 1

|  | Linear UHMW-PE | Comparative 1 | Comparative 2 | Comparative 3 |
| --- | --- | --- | --- | --- |
| Mn$_{DRI}$ (g/mol) | 339,122 | 6,704 | 12,180 | 31,746 |
| Mw$_{DRI}$ (g/mol) | 1,473,891 | 94,866 | 90,693 | 181,281 |
| Mz$_{DRI}$ (g/mol) | 3,472,408 | 627,782 | 463,907 | 729,567 |
| Mn$_{LS}$ (g/mol) | — | 17,607 | 27,617 | 71,110 |
| Mw$_{LS}$ (g/mol) | — | 111,717 | 174,260 | 390,378 |
| Mz$_{LS}$ (g/mol) | — | 795,054 | 1,434,765 | 2,248,953 |
| Mw/Mn[†] | 4.35 | 14.15 | 7.45 | 5.71 |
| g'vis | — | 0.969 | 0.513 | 0.43 |

[†]The Mw/Mn value for the comparative examples was determined by Mw$_{DRI}$/Mn$_{DRI}$.

Examples 1-6 were prepared by the following procedure. A blend containing 2.4 wt % of second polyethylene was solution blended in large quantity and diluted subsequently as dry blend at the entrance of the extruder of the blown film line in order to create films with lower UHMW-PE concentrations. 40 lbs. of Exceed 1018 resin were dissolved into isopar-G at 130° C. under inert atmosphere. 200 ppm of 3,5-di-tert-butylhydroxytoluene (BHT) was added to isopar-G. The target polymer concentration was 2 wt %, which translates to about 220 gallons of solution. Once dissolved, the polymer was recovered by precipitation by adding the hot solution to heptane. The final heptane to isopar-G volumetric ratio was 2. The solid polymer was separated and dried. The final blend UHMW concentration was determined to be 2.4 wt %.

Films were blown on a Little Giant blown film line with a two inch die and a 60 mil die gap. The production rate was 9.5 pounds per linear die inch. The frost line height was 10.5 inches with a blow up ratio of 3, a melt temperature of 207° C., and a film thickness of 0.001 inch.

Comparatives 1-3 were prepared according the procedure of U.S. Publication No. 2016/0272798 A1. These branched second polyethylenes were blended with Exceed PE 2018, and contain an antioxidant package (0.33 wt %) as given in U.S. Publication No. 2016/0272798 A1.

TABLE 2

Summary of film properties and rheology performance for the compositions of UHMW-PE in Exceed PE 1018

| Example | 1 | 2 | 3 | 4 | 5 | 6 | C1 | C2 | C3 |
|---|---|---|---|---|---|---|---|---|---|
| Amount of UHMW (wt %) | 0 | 0.12 | 0.25 | 0.5 | 1.0 | 2.4 | 5 | 3 | 3 |
| Amount of Exceed PE 1018 (wt %) | 100.0 | 99.88 | 99.75 | 99.5 | 99.0 | 97.6 | — | — | — |
| Amount of Exceed PE 2018 | — | — | — | — | — | — | 94.67 | 96.67 | 96.67 |
| Gauge Mic (mils) | | | | | | | | | |
| Average | 1.07 | 1.02 | 0.95 | 0.97 | 0.95 | 1.45 | — | — | 1.00 |
| Low | 0.95 | 0.86 | 0.8 | 0.78 | 0.82 | 1.3 | — | — | 0.93 |
| High | 1.2 | 1.18 | 1.07 | 1.18 | 1.16 | 1.69 | — | — | 1.12 |
| 1% Secant (psi) | | | | | | | | | |
| MD | 27,447 | 26,230 | 26,810 | 28,348 | 29,153 | 33,587 | 31,946 | 26,088 | 26,552 |
| TD | 28,202 | 27,379 | 34,213 | 34,132 | 37,628 | 35,707 | 33,323 | 32,070 | 31,983 |
| Tensile Yield Strength (psi) | | | | | | | | | |
| MD | 1,421 | 1,336 | 1,430 | 1,434 | 1,473 | 1,610 | — | — | 1,285 |
| TD | 1,339 | 1,333 | 1,526 | 1,618 | 1,533 | 1,651 | — | — | 1,416 |
| Elongation @ Yield (%) | | | | | | | | | |
| MD | 6.9 | 6.1 | 6.5 | 6.3 | 6.1 | 7.8 | — | — | 6.7 |
| TD | 5.2 | 5.5 | 6.3 | 7.8 | 7.5 | 8.7 | — | — | 8.5 |
| Tensile Strength (psi) | | | | | | | | | |
| MD | 9,723 | 9,313 | 9,770 | 10,455 | 9,257 | 7,001 | — | — | 6,471 |
| TD | 7,538 | 6,988 | 7,814 | 8,163 | 7,282 | 7,002 | — | — | 7,111 |
| Elongation @ Break (%) | | | | | | | | | |
| MD | 445 | 449 | 423 | 425 | 381 | 316 | — | — | 510 |
| TD | 617 | 602 | 643 | 654 | 630 | 596 | — | — | 703 |
| Elmendorf Tear | | | | | | | | | |
| MD (g) | 248 | 240 | 212.4 | 180.4 | 112.6 | 61.8 | — | — | — |
| TD (g) | 426 | 447 | 464.6 | 584.8 | 626.4 | 640.6 | — | — | — |
| MD (g/mil) | 229 | 231 | 216 | 180.9 | 126 | 65.2 | 281 | 341 | 193 |
| TD (g/mil) | 439 | 435 | 515.8 | 560.4 | 652.8 | 784.5 | — | — | 451 |
| Dart Drop (Phenolic A) (g) | 488 | 464 | 488 | 440 | 434 | 183 | — | — | — |
| Dart Drop (Phenolic A) (g/mil) | 456 | 455 | 513.68 | 453.61 | 456.84 | 126 | 246 | 205 | 426 |
| Tc (° C.) | 108 | 105.6 | 103.6 | 102.3 | 107 | 102.7 | 106.2 | 94.4 | 103.0 |
| Tm (° C.) | 114.3 | 114.6 | 113.4 | 113.4 | 115 | 114 | 120.0 | 110.7 | 117.3 |
| % Crystallinity | 37.2 | 36.5 | 35.8 | 35.3 | 36.9 | 35.4 | — | — | — |
| SAXS Hermans Orientation | 0.1753 | 0.166 | 0.1976 | 0.1894 | 0.2786 | 0.2922 | — | — | — |
| WAXS Hermans Orientation (fa) | 0.232 | 0.225 | 0.249 | 0.243 | 0.259 | 0.244 | — | — | — |
| WAXS Hermans Orientation abs (−fb) | 0.18 | 0.171 | 0.189 | 0.191 | 0.213 | 0.225 | — | — | — |
| Shear Thinning Index (STI) (190° C.) | 3.8 | 4.2 | 5.2 | 5.7 | 6.7 | 10.4 | — | — | — |
| Strain Hardening Ratio (SHR) (150° C., 0.1 s$^{-1}$) | 1 | 1 | 1.9 | 1.9 | 1.9 | 1.9 | 1.7 | 2.6 | — |

Table 2 summarizes the film properties and rheology performance for the compositions of second polyethylene (linear UHMW-PE) in first polyethylene (Exceed PE 1018) as well as a comparison of the compositions having a linear second polyethylene (Examples 1-6) to compositions having a branched second polyethylene (Examples C1-C3). The blown film processability, which is characterized by the strain hardening ratio (SHR) and the shear thinning index (STI) defined in the Test Methods, is significantly improved in comparison to Exceed PE 1018. Major improvements in strain hardening were observed for the films for concentrations of about 0.25 wt % and higher. Shear thinning was improved starting at about 0.25 wt % as well. Below about 0.5 wt %, the films with linear UHMW-PE retain the tear and dart impact properties of Exceed PE 1018. Above about 1 wt %, the linear UHMW-PE shows orientation in the films, which leads to a decrease in dart. The crystallinity is unchanged up to about 2.4 wt % of linear UHMW-PE.

Figure 2:
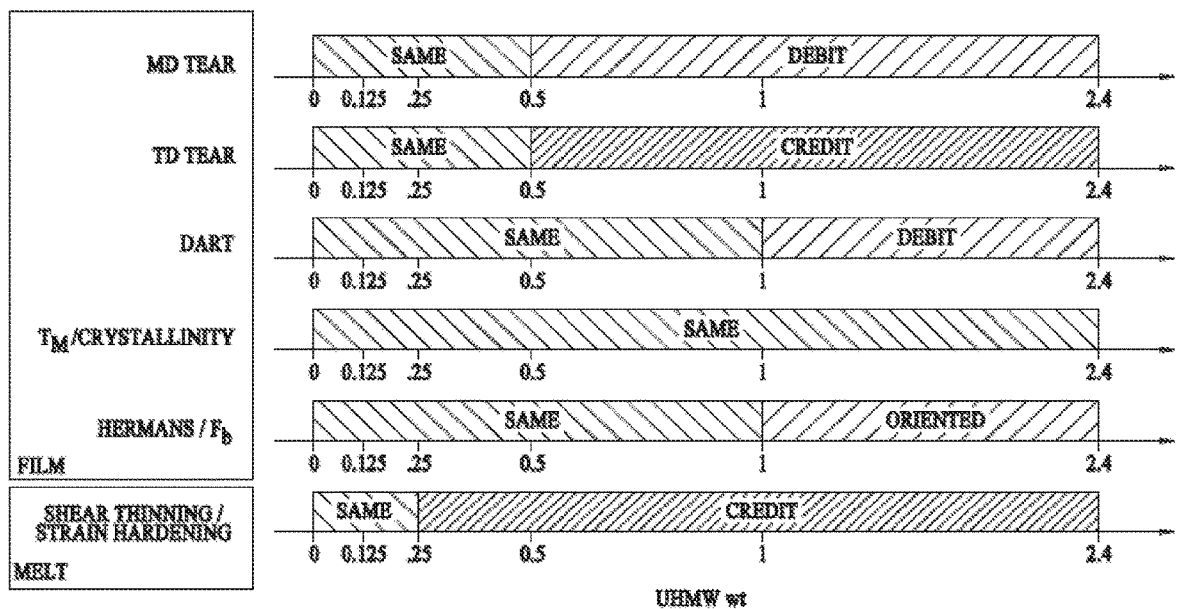
FIG. 2 is a graph illustrating a UHMW linear polyethylene concentration range for which the melt flow performance is improved while film properties are maintained as compared to the neat matrix without the linear UHMW polyethylene.

FIG. 2 shows that there is a linear UHMW-PE concentration range (between about 0.25 and about 0.5 wt %) for which the melt flow performance is improved, while film properties are maintained (as compared to the neat Exceed matrix without linear UHMW-PE). Credit here means that the property improves to the neat matrix without the UHMW-PE component. Defensive means that the property deteriorates compared to the neat matrix without the UHMW-PE component. Oriented in machine direction is known in the art. Above about 0.5 wt % of linear UHMW-PE, MD tear becomes defensive compared to Exceed PE 1018. Shear thinning was improved starting at about 0.25 wt % as well. Below about 0.5 wt %, the films with linear UHMW-PE retain the TD tear and dart impact properties of Exceed PE 1018. Above about 1 wt %, the linear UHMW-PE shows orientation in the films, which leads to a decrease in dart. The crystallinity is unchanged up to about 2.4 wt % of linear UHMW-PE.

This disclosure shows a concentration range (between about 0.125 wt % and about 2.5 wt %) of linear ultra-high molecular weight polyethylene with a given molecular weight to be added to a first polyethylene (i.e., m-LLDPE) in order to provide extensional hardening and improved shear thinning that, without the currently-disclosed UHMW-PE, does not harden upon extension and exhibits inferior shear rheology. After film blowing, the samples containing between up to about 0.5 wt % of UHMW-PE all show similar film performance as that of the neat m-LLDPE matrix.

The data illustrate that linear UHMW-PEs advantageously improve processability of the first polyethylene while retaining blown film properties. Moreover, addition of the linear UHMW-PE provide a means to change such properties on a continuous scale, based on real-time needs, which is conventionally not possible due to the availability of only discrete polyethylene grades. Furthermore, the disclosure shows a different set of relationships between processability and properties, compared to those available from conventional polyethylenes and their blends with conventional branched LDPE, which allows for new and advantageous properties of the fabricated articles.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

We claim:

1. A composition comprising:
   1) about 99.5 wt % to about 99.75 wt % of a linear low density polyethylene (LLDPE) comprising a copolymer of ethylene and one or more $C_3$ to $C_{40}$ alpha-olefins and produced in a gas phase reactor, slurry reactor, solution reactor, or a combination thereof, the LLDPE having:
      a density of about 0.91 g/cm$^3$ to about 0.94 g/cm$^3$;
      a melt index of from about 0.1 to about 5 dg/min;
      a composition distribution breadth index greater than or equal to 60%;
      an $M_w$ of about 20,000 g/mol to less than about 500,000 g/mol;
      a melt strength of about 10 mN or greater;
      a g'$_{vis}$ of about 0.97 or more; and
      an $M_w/M_n$ of about 1.8 to about 6.0; and
   2) about 0.25 wt % to about 0.5 wt % of a high density linear ultra-high molecular weight polyethylene (UHMW-PE) comprising a copolymer of ethylene and one or more $C_3$ to $C_{40}$ alpha-olefins and having:
      an $M_w$ of about 500,000 g/mol or more;
      an $M_w/M_n$ of about 4.0 to about 7.0;
      a density of about 0.94 g/cm$^3$ to about 0.97 g/cm$^3$; and
      a g'$_{vis}$ of about 0.97 or more;
   wherein the composition:
      has a shear thinning index at 190° C. between 4.0 and 11.0; and
      has a strain hardening ratio at 150° C., 0.1 s$^{-1}$ of about 1.5 or more; and
      when formed into a film produces a film having:
         a machine direction Elmendorf Tear greater than about 150 g/mil to 250 g/mil; and
         a Dart Drop (Phenolic A) greater than about 400 g/mil to 550 g/mil.

2. The composition of claim 1, wherein the one or more $C_3$ to $C_{40}$ comonomers of the UHMW-PE are present at from about 0.5 mol % to about 30 mol %.

3. The composition of claim 1, wherein the one or more $C_3$ to $C_{40}$ comonomers of the UHMW-PE are one or more $C_6$ to $C_{40}$ alpha-olefins.

4. The composition of claim 1, wherein the one or more $C_3$ to $C_{40}$ comonomers of the UHMW-PE are one or more of butene, hexene, and octene.

5. The composition of claim 1, wherein the UHMW-PE has one or more of the following properties:
   an $M_w$ of about 1,000,000 g/mol or more;
   a g'$_{vis}$ of about 0.975 or more.

6. The composition of claim 1, wherein the LLDPE comprises a copolymer of ethylene and one or more $C_3$ to $C_{20}$ alpha-olefins.

7. A film formed from a composition comprising:
   1) About 99.5 wt % to about 99.75 wt % of a linear low density polyethylene (LLDPE) comprising a copolymer of ethylene and one or more $C_3$ to $C_{40}$ alpha-olefins and produced in a gas phase reactor, slurry reactor, solution reactor, or a combination thereof, the LLDPE having:
      a density of about 0.91 g/cm$^3$ to about 0.94 g/cm$^3$;
      a melt index of from about 0.1 to about 5 dg/min or less;
      a composition distribution breadth index greater than or equal to 60%;
      an $M_w$ of about 20,000 g/mol to less than about 500,000 g/mol;
      a melt strength of about 10 mN or greater;
      a g'$_{vis}$ of about 0.97 or more; and
      an $M_w/M_n$ of about 1.8 to about 6.0; and
   2) about 0.25 wt % to about 0.5 wt % of a high density linear ultra-high molecular weight polyethylene (UHMW-PE) comprising a copolymer of ethylene and one or more $C_3$ to $C_{40}$ alpha-olefins and having:
      an $M_w$ of about 500,000 g/mol or more;
      an $M_w/M_n$ of about 4.0 to about 7.0;
      a density of about 0.94 g/cm$^3$ to about 0.97 g/cm$^3$; and
      a g'$_{vis}$ of about 0.97 or more;
   wherein the composition:
      has a shear thinning index at 190° C. between 4.0 and 11.0; and
      has a strain hardening ratio at 150° C., 0.1 s$^{-1}$ of about 1.5 or more; and
      the film having:
         a machine direction Elmendorf Tear greater than about 150 g/mil to 250 g/mil; and
         a Dart Drop (Phenolic A) greater than about 400 g/mil to 550 g/mil.

8. The film of claim 7, wherein the film is at least about 75 μm thick.

9. The film of claim 7, wherein the film has one or more of the following properties:
   a TD tear between about 400 g/mil and about 800 g/mil; and
   a wide-angle x-ray scattering Hermans Orientation, absolute value, between about 0.18 and about 0.22.

10. A method of making a composition, comprising blending:
   1) About 99.5 wt % to about 99.75 wt % of a linear low density polyethylene (LLDPE) comprising a copolymer of ethylene and one or more $C_3$ to $C_{40}$ alpha-olefins and produced in a gas phase reactor, slurry reactor, solution reactor, or a combination thereof, the LLDPE having:
      a density of about 0.91 $g/cm^3$ to about 0.94 $g/cm^3$;
      a melt index of from about 0.1 to about 5 dg/min or less;
      a composition distribution breadth index greater than or equal to 60%;
      an $M_w$ of about 20,000 g/mol to less than about 500,000 g/mol;
      a melt strength of about 10 mN or greater;
      a $g'_{vis}$ of about 0.97 or more; and
      an $M_w/M_n$ of about 1.8 to about 6.0; and
   2) about 0.25 wt % to about 0.5 wt % of a high density linear ultra-high molecular weight polyethylene (UHMW-PE) comprising a copolymer of ethylene and one or more $C_3$ to $C_{40}$ alpha-olefins and having:
      an $M_w$ of about 500,000 g/mol or more;
      an $M_w/M_n$ of about 4.0 to about 7.0;
      a density of about 0.94 $g/cm^3$ to about 0.97 $g/cm^3$; and
      a $g'_{vis}$ of about 0.97 or more;
   wherein the composition:
      has a shear thinning index at 190° C. between 4.0 and 11.0; and
      has a strain hardening ratio at 150° C., 0.1 $s^{-1}$ of about 1.5 or more; and
   when formed into a film produces a film having:
      a machine direction Elmendorf Tear greater than about 150 g/mil to 250 g/mil; and
      a Dart Drop (Phenolic A) greater than about 400 g/mil to 550 g/mil.

11. The composition of claim 1, wherein when formed into a film produces a film having one or more of the following properties:
   a TD tear between about 500 g/mil and about 800 g/mil; and
   a wide-angle x-ray scattering Hermans Orientation, absolute value, between about 0.18 and about 0.22.

12. The composition of claim 1, wherein the LLDPE and the UHMW-PE have a difference in density of 0.05 $g/cm^3$.

13. The film of claim 7, wherein the UHMW-PE comprises at least about 50 mol % of ethylene one or more $C_3$ to $C_{40}$ comonomers.

14. The film of claim 13, wherein the one or more $C_3$ to $C_{40}$ comonomers of the UHMW-PE are present at from about 0.5 mol % to about 30 mol %.

15. The film of claim 13, wherein the one or more $C_3$ to $C_{40}$ comonomers of the UHMW-PE are one or more $C_6$ to $C_{40}$ alpha-olefins.

16. The film of claim 13, wherein the one or more $C_3$ to $C_{40}$ comonomers of the UHMW-PE are one or more of butene, hexene, and octene.

17. The film of claim 7, wherein the UHMW-PE has one or more of the following properties:
   an $M_w$ of about 1,000,000 g/mol or more;
   a $g'_{vis}$ of about 0.975 or more.

* * * * *